(12) United States Patent
Holtcamp et al.

(10) Patent No.: US 11,198,747 B2
(45) Date of Patent: Dec. 14, 2021

(54) CATALYST SYSTEMS INCLUDING TWO HAFNOCENE CATALYST COMPOUNDS

(71) Applicant: ExxonMobil Chemical Patents Inc., Baytown, TX (US)

(72) Inventors: Matthew W. Holtcamp, Huffman, TX (US); Laughlin G. McCullough, League City, TX (US); Kevin A. Stevens, Houston, TX (US); Subramaniam Kuppuswamy, Mont Belvieu, TX (US); Matthew S. Bedoya, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 189 days.

(21) Appl. No.: 16/425,159

(22) Filed: May 29, 2019

(65) Prior Publication Data

US 2019/0367649 A1 Dec. 5, 2019

Related U.S. Application Data

(60) Provisional application No. 62/680,349, filed on Jun. 4, 2018.

(51) Int. Cl.
| | |
|---|---|
| *C08F 4/653* | (2006.01) |
| *C08F 4/6592* | (2006.01) |
| *C08F 210/16* | (2006.01) |
| *C08F 4/659* | (2006.01) |

(52) U.S. Cl.
CPC ........ *C08F 210/16* (2013.01); *C08F 4/65904* (2013.01); *C08F 4/65925* (2013.01); *C08F 4/65927* (2013.01); *C08F 2420/01* (2013.01); *C08F 2420/03* (2013.01)

(58) Field of Classification Search
CPC .............. C08F 4/65904; C08F 4/65925; C08F 4/65927; C08F 210/16
See application file for complete search history.

(56) References Cited

U.S. PATENT DOCUMENTS

| | | | |
|---|---|---|---|
| 5,739,366 A | 4/1998 | Imuta et al. | |
| 5,767,033 A | 6/1998 | Imuta et al. | |
| 6,124,413 A | 9/2000 | Banzi et al. | |
| 7,385,015 B2 | 6/2008 | Holtcamp | |
| 9,657,122 B2 | 5/2017 | Tse et al. | |
| 2003/0236364 A1 | 12/2003 | McCullough et al. | ......... 526/68 |
| 2017/0114167 A1 | 4/2017 | Holtcamp et al. | .... C08F 210/16 |
| 2017/0342176 A1 | 11/2017 | Wang et al. | .......... C08F 210/16 |
| 2018/0044446 A1 | 2/2018 | Lief et al. | ............... C08F 10/06 |
| 2018/0066089 A1 | 3/2018 | Clark et al. | ........... C08F 210/16 |
| 2018/0155474 A1 | 6/2018 | Holtcamp et al. | .... C08F 210/02 |
| 2018/0237554 A1 | 8/2018 | Holtcamp et al. | |
| 2018/0237558 A1 | 8/2018 | McCullough | |
| 2018/0237559 A1 | 8/2018 | Kuppuswamy et al. | |
| 2018/0305532 A1 | 10/2018 | Zhang et al. | ....... C08L 23/0815 |
| 2019/0040167 A1 | 2/2019 | Holtcamp et al. | |
| 2019/0040168 A1 | 2/2019 | Holtcamp et al. | |
| 2019/0127502 A1 | 5/2019 | Holtcamp et al. | |
| 2019/0283009 A1 | 9/2019 | Holtcamp et al. | ... B01J 31/2295 |

FOREIGN PATENT DOCUMENTS

| | | | |
|---|---|---|---|
| CN | 1267656 | 9/2000 | |
| EP | 1209165 | 5/2002 | |
| EP | 1250342 | 6/2006 | |
| EP | 2 374 822 | 10/2011 | |
| EP | 3330296 | 6/2018 | ............ C08F 4/6592 |
| EP | 3031831 | 6/2019 | .............. C08F 4/659 |
| WO | 2019-027587 | 2/2019 | ............ C08F 210/16 |

OTHER PUBLICATIONS

Angpanitcharoen, P. et al. (2016) "Supported bis(peralkylindenyl)metallocene catalysts for slurry phase ethylene polymerization," *Polyhedron*, v.116, pp. 216-222.

Arnold, Thomas A.Q. et al. (2015) "Synthesis, Characterisation, and Polymerisation Studies of Hexamethylindenyl Zirconocenes and Hafnocenes," *Jrnl. Organometallic Chem.*, v.792, pp. 55-65.

Stadelhofer et al., "Darstellung und eigenschaften von alkylmetallcyclopentadienderivaten des aluminiums, galliums und indiums," Journal of Organometallic Chemistry, 1975, vol. 84, No. 1, pp. C1-C4.

*Primary Examiner* — Caixia Lu

(57) ABSTRACT

The present disclosure relates to dual catalyst systems and processes for use thereof. The present disclosure further provides a catalyst system that is a combination of at least two hafnium metallocene catalyst compounds. The catalyst systems may be used for olefin polymerization processes. The present disclosure further provides for polymers, which can be formed by processes and catalyst systems of the present disclosure.

20 Claims, 1 Drawing Sheet

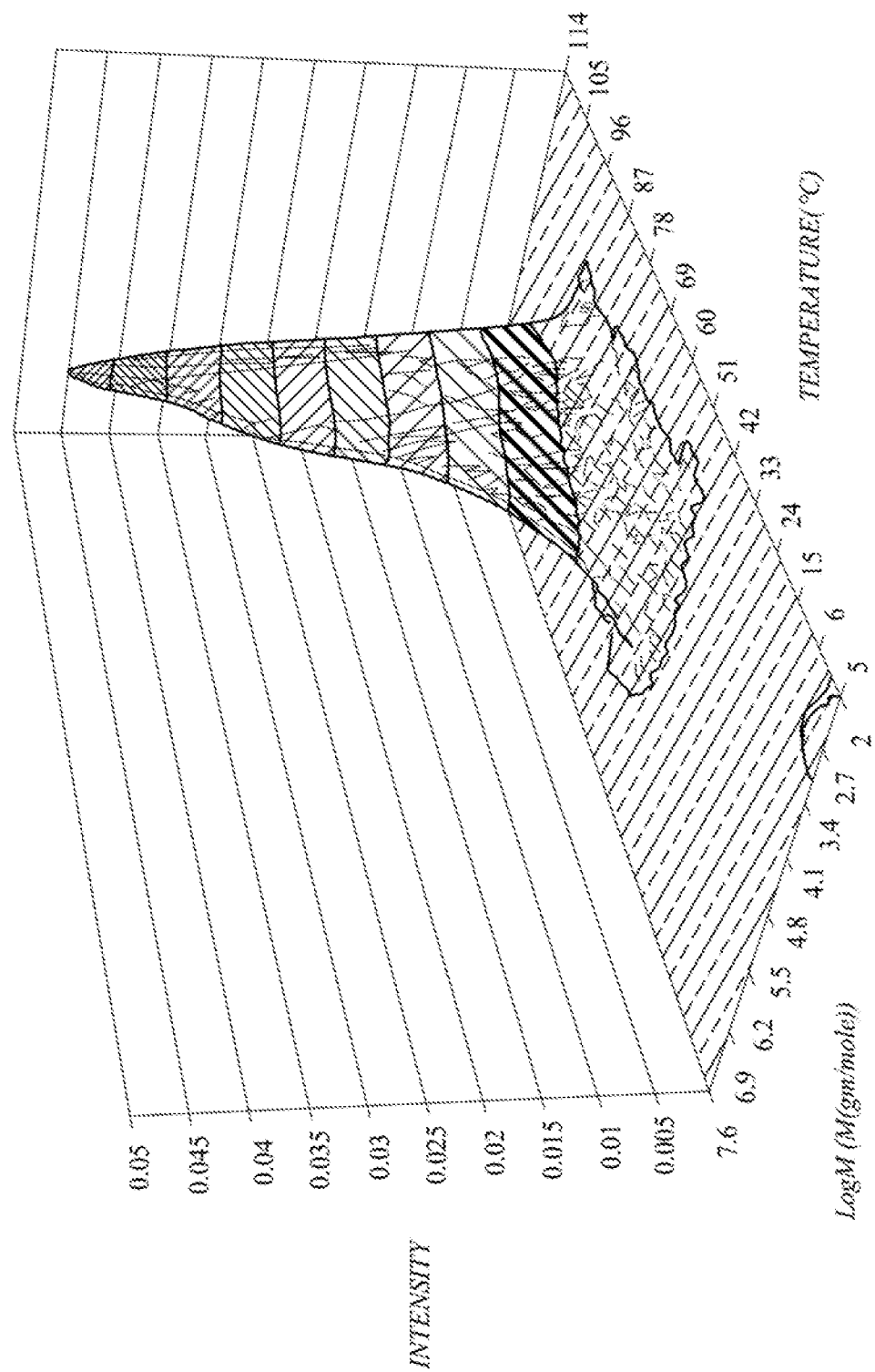

CATALYST SYSTEMS INCLUDING TWO HAFNOCENE CATALYST COMPOUNDS

PRIORITY CLAIM

This application claims priority to and the benefit of U.S. Ser. No. 62/680,349, filed Jun. 4, 2018 and is incorporated by reference in its entirety.

FIELD OF THE INVENTION

The present disclosure relates to dual catalyst systems and processes for use thereof. In particular, catalyst systems include a combination of at least two group 4 metallocene catalyst compounds. Catalyst systems may further include an activator and or a support material. The catalyst system may be used for olefin polymerization processes.

BACKGROUND OF THE INVENTION

Polymers, such as polyolefin polymers, are widely used commercially because of their robust physical properties. For example, various types of polyethylene polymers, including high density, low density, and linear low density polyethylene polymers, are some of the most commercially useful. Low density polyethylene is generally prepared at high pressure using free radical initiators, or in gas phase processes using Ziegler-Natta or vanadium catalysts. Low density polyethylene typically has a density in the range of 0.916 g/cm$^3$ to 0.940 g/cm$^3$. Typical low density polyethylene produced using free radical initiators is referred to in the industry as "LDPE". LDPE is also referred to as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is referred to as "linear low density polyethylene" ("LLDPE") and is typically produced by conventional Ziegler-Natta catalysts or with metallocene catalysts. "Linear" means that the polyethylene has few, if any, long chain branches, typically referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, typically 0.890 g/cm$^3$ to 0.915 g/cm$^3$ or 0.900 g/cm$^3$ to 0.915 g/cm$^3$.

Copolymers of polyolefins, such as polyethylene copolymers, have a comonomer, such as hexene, incorporated into the polyethylene backbone. These copolymers provide varying physical properties compared to polyethylene alone and are typically produced in a low pressure reactor, utilizing, for example, solution, slurry, and/or gas phase polymerization processes. Polymerization may take place in the presence of catalyst systems such as those employing a Ziegler-Natta catalyst, a chromium based catalyst, and/or a metallocene catalyst.

These copolymers have a composition distribution, which refers to the distribution of comonomer in the copolymer, typically in the copolymer backbone. When the amount of comonomer varies among the copolymer molecules, the composition is said to have a "broad" composition distribution. When the amount of comonomer per 1,000 carbons is similar among the copolymer molecules of different chain lengths, the composition distribution is said to be "narrow".

The composition distribution is thought to influence the properties of a copolymer composition, for example, stiffness, toughness, environmental stress crack resistance, optical properties, and heat sealing. The composition distribution of a polyolefin composition may be readily measured by, for example, Temperature Rising Elution Fractionation (TREF) or Crystallization Analysis Fractionation (CRYSTAF).

A composition distribution of a copolymer composition is influenced by the identity of the catalyst used to form the polyolefins of the composition. Ziegler-Natta catalysts and chromium based catalysts typically produce compositions with broad composition distributions, whereas metallocene catalysts typically produce compositions with narrow composition distributions.

Furthermore, polyolefins, such as polyethylenes, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition. As used herein, "high molecular weight" is defined as a weight average molecular weight (Mw) value of 150,000 g/mol or more. "Low molecular weight" is defined as an Mw value of less than 150,000 g/mol.

For example, useful bimodal polyolefin compositions include a first polyolefin having low molecular weight and low comonomer content (i.e., comonomer incorporated into the polyolefin backbone) while a second polyolefin has a high molecular weight and high comonomer content. As used herein, "low comonomer content" is defined as a polyolefin having 6 wt % or less of comonomer based upon the total weight of the polyolefin. The high molecular weight fraction produced by the second catalyst compound may have a high comonomer content. As used herein, "high comonomer content" is defined as a polyolefin having greater than 6 wt % of comonomer based upon the total weight of the polyolefin.

There are several methods for producing bimodal or broad molecular weight distribution polyolefins, e.g., melt blending, polymerization in reactors in series or parallel configuration, or single reactor with bimetallic catalysts. However, methods such as melt blending suffer from the disadvantages brought by the need for complete homogenization of polyolefin compositions and high cost.

Furthermore, synthesizing these bimodal polyolefin compositions in a mixed catalyst system would involve a first catalyst to catalyze the polymerization of, for example, ethylene under substantially similar conditions as that of a second catalyst while not interfering with the catalysis of polymerization of the second catalyst. For example, two different metallocene catalysts may interfere with the polymerization catalysis of each other, resulting in reduced catalytic activity, reduced molecular weight polyolefins, reduced comonomer incorporation, and potential fouling.

In addition, carbon-carbon double bonds along a polymer backbone (referred to as "internal unsaturation") can disrupt the crystallization of polymer chains and contribute to an amorphous phase of the polymer resin which may contribute to stronger mechanical properties when the polymer is used as a film. For example, 0.4 or greater internal unsaturations per 1,000 carbons of the polymer can lower the density of the polymer and provide a more amorphous material, as compared to a polymer having a lower amount of internal unsaturations.

Useful catalysts for olefin polymerization are often based on cyclopentadienyl transition metal catalyst compounds (metallocenes) as catalyst precursors combined with activators, such as an alumoxane or with an activator containing a non-coordinating anion. Suitable metallocene catalyst system often include metallocene catalyst, activator, and optional support. Supported catalyst systems are used in many polymerization processes, often in slurry or gas phase polymerization processes.

However, there exists a need for catalyst systems that provide polyolefin compositions having novel combinations of comonomer content fractions, internal unsaturation content, and molecular weights. There is further a need for novel catalyst systems where a first catalyst does not negatively impact the polymerization catalysis of a second catalyst or vice versa.

Additional references of interest include: U.S. Pat. No. 7,385,015; EP 1209165 A2; U.S. Pat. Nos. 5,739,366; 5,767,033; 9,657,122; 6,124,413; EP 1250342 B1; CN 1267656A; US 2019/0040167; US 2019/0040168; US 2019/0127502; US 2018/0237558; US 2018/0237559; and US 2018/0237554.

SUMMARY OF THE INVENTION

The present disclosure provides a catalyst system comprising: a bridged hafnium metallocene compound, an unbridged hafnium metallocene compound, a support material, and an activator. The bridged hafnium compound is represented by the formula (I):

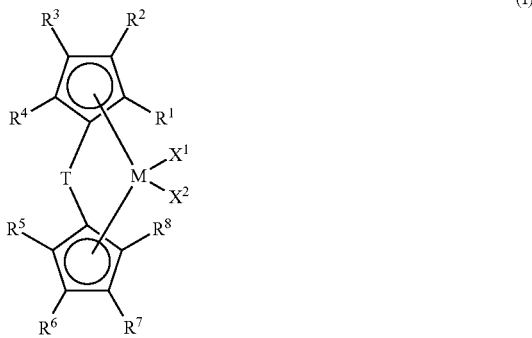

(I)

wherein:
M is Hf;
each of $R^1$, $R^2$, $R^3$, $R^4$ $R^5$, $R^6$, $R^7$, and $R^8$ is independently hydrogen, alkoxide, $C_1$ to $C_{40}$ substituted or unsubstituted hydrocarbyl, or —$R^{13}$—$SiR'_3$ or —$R^{13}$—$CR'_3$ wherein $R^{13}$ is $C_1$ to $C_4$ hydrocarbyl, and each R' is independently hydrogen or $C_1$ to $C_{20}$ substituted or unsubstituted hydrocarbyl, or two or more of $R^1$, $R^2$, $R^3$, and $R^4$ form a substituted or unsubstituted, saturated, partially unsaturated or aromatic, cyclic or polycyclic substituent ring, or two or more of $R^5$, $R^6$, $R^7$, and $R^8$ form a substituted or unsubstituted, saturated, partially unsaturated or aromatic, cyclic or polycyclic substituent ring, wherein at least one of $R^1$, $R^2$, $R^3$, $R^4$, $R^5$, $R^6$, $R^7$, and $R^8$ is —$R^{13}$—$SiR'_3$ or —$R^{13}$—$CR'_3$ wherein $R^{13}$ is $C_1$ to $C_4$ hydrocarbyl, and each R' is independently hydrogen or $C_1$ to $C_{20}$ substituted or unsubstituted hydrocarbyl;

T is a bridging group; and
each of $X^1$ and $X^2$ is independently a univalent anionic ligand, a diene ligand, an alkylidene ligand, or $X^1$ and $X^2$ are joined to form a metallocyclic ring.

The unbridged hafnium metallocene compound is represented by formula (II):

$(Ind)_s(Cp)_mM'X_q$ (II), wherein:
M' is an Hf;
Ind is an indenyl group substituted with 1 to 7 hydrocarbyl or substituted hydrocarbyl groups; Cp is a cyclopentadienyl group substituted with 4 or 5 hydrocarbyl or substituted hydrocarbyl groups;
each X is, independently, a leaving group;
s is 1 or 2; m is 0 or 1; s+m is 2; q is 0, 1, or 2; and s+m+q is 3 or 4.

The present disclosure further provides processes for polymerization of monomers (such as olefin monomers) including contacting one or more monomers with the above catalyst systems.

The present disclosure further provides processes to produce ethylene polymer compositions including: i) contacting in a single reaction zone, in the gas phase or slurry phase, ethylene and $C_3$ to $C_{20}$ comonomer with the catalyst system described above, and ii) obtaining an in-situ ethylene polymer composition having at least 70 mol % ethylene, an internal unsaturation content greater than 0.2 unsaturations per 1,000 carbons, and a density of 0.920 g/cm³ or more, alternatively 0.945 g/cm³ or more.

The present disclosure further provides a process to produce ethylene polymer compositions including: i) contacting in a single reaction zone, in the gas phase or slurry phase, ethylene and $C_3$ to $C_{20}$ comonomer with a the catalyst system described above, and obtaining an ethylene polymer: a) a MIR of about 17 or greater, an MI of 0.90 or greater g/10 min and a catalyst activity of 2700 gP/gCat or greater; or b) a MIR of 26.5 or greater, an MI of 1.04 g/10 min and or a catalyst productivity of 2100 gP/gCat or greater.

The present disclosure further provides polymer compositions produced by the methods and catalyst systems described herein.

BRIEF DESCRIPTION OF THE DRAWING

The FIGURE is a gel permeation chromatography spectrum of the ethylene hexene copolymer formed by a catalyst system of the present disclosure, according to one embodiment.

DETAILED DESCRIPTION

The present disclosure provides dual catalyst systems and processes for use thereof. In particular, the catalyst system includes a bridged hafnium metallocene catalyst, an unbridged hafnium metallocene catalyst, a support material and an activator. The catalyst system is used for olefin polymerization processes. Catalyst systems of the present disclosure can provide increased activity, increased productivity, or enhanced polymer properties, to increase conversion or comonomer incorporation, or to alter comonomer distribution. Catalyst systems and processes of the present disclosure can provide ethylene polymers having the unique properties of high stiffness, high toughness and good processability.

The present disclosure further provides a process to produce ethylene polymer compositions comprising: i) contacting in a single reaction zone, in the gas phase or slurry phase, ethylene and $C_3$ to $C_{20}$ comonomer with the catalyst system described herein, ii) obtaining an in-situ ethylene polymer composition having at least 50 mol % ethylene and a density of 0.890 g/cm³ or greater, alternatively 0.948 g/cm³ or greater, and iii) a level of internal unsaturation of 0.4 or greater internal unsaturation per 1,000 carbons.

For purposes of the present disclosure, a "catalyst system" is a combination of at least two catalyst compounds, an activator, and a support material. The catalyst systems may further comprise one or more additional catalyst compounds. The terms "mixed catalyst system," "dual catalyst system," "mixed catalyst," and "supported catalyst system" may be used interchangeably herein with "catalyst system." For the purposes of the present disclosure, when catalyst systems are described as comprising neutral stable forms of the components, it is well understood by one of ordinary skill in the art, that the ionic form of the component is the form that reacts with the monomers to produce polymers.

As used herein, the term "metallocene compound" includes compounds having two or three Cp ligands (cyclopentadienyl and ligands isolobal to cyclopentadienyl) bound to at least one Hf metal atom, and one or more leaving group(s) bound to the at least one metal atom.

For purposes of the present disclosure in relation to all metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "metal catalyst compound", "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise, the terms "group," "radical," and "substituent" are also used interchangeably in this document. For purposes of the present disclosure, "hydrocarbyl radical" is defined to be $C_1$-$C_{100}$ radicals, that may be linear, branched, or cyclic, and when cyclic, aromatic or non-aromatic.

For purposes of the present disclosure, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like (where R* is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S.

The term "arylalky" is an aryl-substituted alkyl radical and may be used interchangeably with the term "aralkyl." Examples of aralkyl include benzyl, diphenylmethyl, triphenylmethyl, phenylethyl, and diphenylethyl.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of the present disclosure, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene; and an ethylene polymer having a density of more than 0.940 g/cm³ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm³).

Polyethylene in an overlapping density range, i.e., 0.890 to 0.930 g/cm³, such as from 0.915 to 0.930 g/cm³, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches and is referred to as a branching index ($g'_{vis}$) of 0.97 or above, such as 0.98 or above. Branching index, $g'_{vis}$, is measured by GPC-4D as described below.

For purposes of the present disclosure, ethylene shall be considered an alpha-olefin (α-olefin).

As used herein, $M_n$ is number average molecular weight, $M_w$ is weight average molecular weight, and $M_z$ is z average molecular weight, wt % is weight percent, and mol % is mole percent. Unless otherwise noted, all average molecular weights (e.g., Mw, Mn, Mz) are reported in units of g/mol. Molecular weight distribution (MWD), also referred to as polydispersity index (PDI), is defined to be Mw divided by Mn.

The following abbreviations may be used herein: Me is methyl, Et is ethyl, t-Bu and ᵗBu are tertiary butyl, iPr and ⁱPr are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

The present disclosure provides a catalyst system comprising: a bridged hafnium metallocene compound, an unbridged hafnium metallocene compound, a support material and an activator. The bridged hafnium metallocene compound is represented by the formula (I):

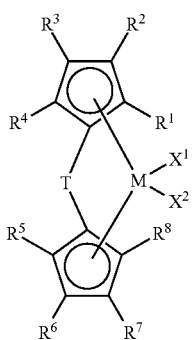

(I)

wherein:

M is Hf;

each of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently hydrogen or $C_1$ to $C_{20}$ substituted or unsubstituted hydrocarbyl; or two or more of $R^1$, $R^2$, $R^3$, and $R^4$ form a substituted or unsubstituted, saturated, partially unsaturated or aromatic, cyclic or polycyclic substituent ring;

each of $R^5$, $R^6$, $R^7$, and $R^8$ is independently hydrogen, alkoxide, $C_1$ to $C_{40}$ substituted or unsubstituted hydrocarbyl, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl, or two or more of $R^5$, $R^6$, $R^7$, and $R^8$ form a substituted or unsubstituted, saturated, partially unsaturated or aromatic, cyclic or polycyclic substituent ring;

wherein at least one (preferably at least two, alternately at least 3, 4, 5, 6, 7, or 8) of $R^1$, $R^2$, $R^3$, $R^4$, $R^5$, $R^6$, $R^7$, and $R^8$ is —$R^{13}$—$SiR'_3$ or —$R^{13}$—$CR'_3$ where $R^{13}$ is $C_1$ to $C_4$ hydrocarbyl, and each R' is independently hydrogen or $C_1$ to $C_{20}$ substituted or unsubstituted hydrocarbyl;

T is a bridging group; and each of $X^1$ and $X^2$ is independently a univalent anionic ligand, a diene ligand, an alkylidene ligand, or $X^1$ and $X^2$ are joined to form a metallocyclic ring.

The unbridged hafnium metallocene compound is represented by formula (II):

$$(Ind)_s(Cp)_mM'X_q \qquad (II),$$

wherein:

M' is a Hf;

Ind is an indenyl group substituted with 1 to 7 hydrocarbyl or substituted hydrocarbyl groups;

Cp is a cyclopentadienyl group substituted with 4 or 5 hydrocarbyl or substituted hydrocarbyl groups;

each X is, independently, a leaving group (such as a halide, a hydride, an alkyl group, an alkenyl group or an arylalkyl group);

s is 1 or 2; m is 0 or 1; s+m is 2; q is 0, 1, or 2; and s+m+q is 3 or 4.

In some embodiments, s is 2, alternately in some embodiments m is 1 and s is 1.

Preferably, each Ind group is substituted with at least two (alternately at least 3, 4, 5, 6, or 7) hydrocarbyl or substituted hydrocarbyl groups.

The present disclosure further provides processes for polymerization of monomers (such as olefin monomers) comprising contacting one or more monomers with the above catalyst systems.

The present disclosure further provides polymer compositions produced by the methods and catalyst systems described herein.

In at least one embodiment, a catalyst represented by formula (I) is a good comonomer (such as hexene) incorporator and yields polyethylene with higher molecular weight than a catalyst represented by formula (II) which, under similar conditions, yields lower molecular weight polymer than a catalyst represented by formula (I). A catalyst represented by formula (II) can also incorporate less comonomer (such as hexene) under similar reaction conditions. When a catalyst represented by formula (I) and a catalyst represented by formula (II) are combined on one support, an in-reactor blend of polyethylene is produced with a mix of low and high density resins in which the higher density resin (higher melting) is combined with lower density higher molecular weight resin. A catalyst represented by formula (I) may be a single isomer or a combination of isomers, e.g., 2 or 3 isomers, such as 1 or 2 isomers.

The two transition metal catalyst compounds may be used in any suitable ratio. Suitable molar ratios of (I) a bridged group 4 metallocene compound to (II) an unbridged group 4 metallocene compound fall within the range of (I):(II) 1:1000 to 1000:1, alternatively 1:100 to 500:1, alternatively 1:10 to 200:1, alternatively 1:1 to 100:1, and alternatively 1:1 to 75:1, and alternatively 2:1 to 1:1. The particular ratio chosen will depend on the catalyst compounds chosen, the method of activation, and the end product desired. In at least one embodiment, when using the two catalyst compounds, where both are activated with the same activator, mole percents, based upon the molecular weight of the catalyst compounds, are 10 to 99.9% (I) to 0.1 to 90% (II), alternatively 25 to 99% (I) to 1 to 75% (II), alternatively 50 to 99% (I) to 1 to 50% (II), and alternatively 75 to 99% (I) to 1 to 25% (II).

For purposes of the present disclosure, one metallocene catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of the present disclosure, e.g., rac-bis(1-methylindenyl)hafnium dimethyl is considered to be the same as meso-bis(1-methyl-indenyl)hafnium dimethyl. Thus, as used herein, a single metallocene catalyst component having a racemic and/or meso isomer does not, itself, constitute two different metallocene catalyst components.

The present disclosure further provides a process to produce ethylene polymer compositions comprising: i) contacting in a single reaction zone, in the gas phase or slurry phase, ethylene and $C_3$ to $C_{20}$ comonomer with the catalyst system described above, ii) obtaining an in-situ ethylene polymer composition having at least 50 mol % ethylene, iii) a density of 0.890 g/cm$^3$ or greater, alternatively 0.948 g/cm$^3$ or greater, and iv) a level of internal unsaturation of 0.4 or greater internal unsaturations per 1,000 carbons. Without wishing to be bound by theory, it is believed that the ethylene polymer produced herein (i.e., an in-situ ethylene polymer composition) has at least two polymer components where the first component is derived from the catalyst represented by formula (I) and has less comonomer (such as hexene) and higher Mw as compared to the second component derived from the catalyst represented by formula (II) which has less comonomer (such as hexene) and lower Mw as compared to the first component as determined by 4D GPC.

Bridged Metallocenes

In aspects of the present disclosure, the catalyst systems comprise a transition metal complex represented by the formula (I):

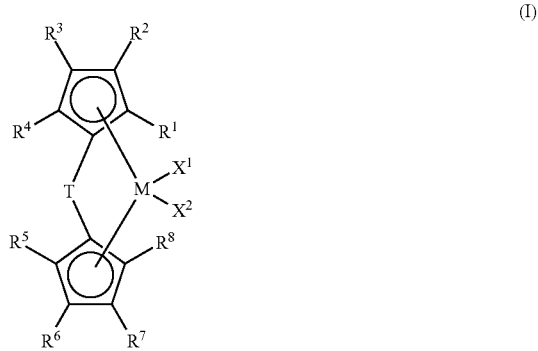

wherein:
M is Hf;
each of $R^1$, $R^2$, $R^3$, and $R^4$ is independently hydrogen, alkoxide, $C_1$ to $C_{40}$ substituted or unsubstituted hydrocarbyl, or —$R^{13}$—SiR'$_3$ or —$R^{13}$—CR'$_3$ where $R^{13}$ is $C_1$ to $C_4$ hydrocarbyl, and each R' is independently hydrogen or $C_1$ to $C_{20}$ substituted or unsubstituted hydrocarbyl; or two or more of $R^1$, $R^2$, $R^3$, and $R^4$ form a substituted or unsubstituted, saturated, partially unsaturated or aromatic, cyclic or polycyclic substituent ring;
each of $R^5$, $R^6$, $R^7$, and $R^8$ is independently hydrogen, alkoxide, $C_1$ to $C_{40}$ substituted or unsubstituted hydrocarbyl, —$R^{13}$—SiR'$_3$ or —$R^{13}$—CR'$_3$ where $R^{13}$ is $C_1$ to $C_4$ hydrocarbyl, and each R' is independently $C_1$ to $C_{20}$ substituted or unsubstituted hydrocarbyl, or two or more of $R^5$, $R^6$, $R^7$, and $R^8$ form a substituted or unsubstituted, saturated, partially unsaturated or aromatic, cyclic or polycyclic substituent ring; wherein at least one (alternately at least 2, 3, 4, 5, 6, 7, or 8) of $R^1$, $R^2$, $R^3$, $R^4$, $R^5$, $R^6$, $R^7$, and $R^8$ is —$R^{13}$—SiR'$_3$ or —$R^{13}$—CR'$_3$ where $R^{13}$ is $C_1$ to $C_4$ hydrocarbyl, and each R' is independently hydrogen or $C_1$ to $C_{20}$ substituted or unsubstituted hydrocarbyl;
T is a bridging group; and
each of $X^1$ and $X^2$ is independently a univalent anionic ligand, a diene ligand, an alkylidene ligand, or $X^1$ and $X^2$ are joined to form a metallocyclic ring.

In at least one embodiment, each $R^1$, $R^3$, and $R^4$ is independently hydrogen, or a substituted $C_1$ to $C_{12}$ hydrocarbyl group or an unsubstituted $C_1$ to $C_{12}$ hydrocarbyl group, such as each $R^1$, $R^3$, and $R^4$ is independently a $C_1$ to $C_{20}$ alkyl group, such as hydrogen, methyl, ethyl, propyl, butyl, pentyl, hexyl, or an isomer thereof, such as hydrogen or methyl.

In at least one embodiment, M is Hf or Zr, such as Hf, each $R^1$, $R^3$, $R^4$ and $R^5$ is a $C_1$ to $C_{20}$ alkyl group and $R^2$ is —$CH_2SiR'_3$ or —$CH_2CR'_3$ where R' is $C_1$ to $C_{20}$ alkyl or aryl.

In at least one embodiment, $R^2$ is hydrogen, or a substituted $C_1$ to $C_{12}$ hydrocarbyl group or an unsubstituted $C_1$ to $C_{12}$ hydrocarbyl group, such as $R^2$ is a $C_1$ to $C_{20}$ alkyl group, such as hydrogen, methyl, ethyl, propyl, butyl, pentyl, hexyl, or an isomer thereof, such as hydrogen or methyl, or $R^2$ is —$R^{13}$—SiR'$_3$ or is —$R^{13}$—CR'$_3$ where $R^{13}$ is a $C_1$ to $C_4$ hydrocarbyl (such as $CH_2$; $CH_2CH_2$, (Me)CHCH$_2$, (Me)CH), and each R' is independently hydrogen or a $C_1$ to $C_{20}$ substituted or unsubstituted hydrocarbyl, such as a substituted $C_1$ to $C_{12}$ hydrocarbyl group or an unsubstituted $C_1$ to $C_{12}$ hydrocarbyl group, such as methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H.

Alternatively, $R^2$ is —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$, —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternatively, each of $R^1$, $R^2$, $R^3$, and $R^4$ is not H.

In at least one embodiment of the present disclosure, each of $R^5$, $R^7$ and $R^8$ is independently hydrogen, or a substituted $C_1$ to $C_{12}$ hydrocarbyl group or an unsubstituted $C_1$ to $C_{12}$ hydrocarbyl group, such as a $C_1$ to $C_{20}$ alkyl group, such as hydrogen, methyl, ethyl, propyl, butyl, pentyl, hexyl, or an isomer thereof, such as a hydrogen or methyl.

In at least one embodiment of the present disclosure, $R^6$ is —$R^{13}$—$SiR'_3$ or is —$R^{13}$—$CR'_3$ where $R^{13}$ is a $C_1$ to $C_4$ hydrocarbyl (such as $CH_2$, $CH_2CH_2$, (Me)$CHCH_2$, (Me)CH), and each R' is independently hydrogen or a $C_1$ to $C_{20}$ substituted or unsubstituted hydrocarbyl, such as a substituted $C_1$ to $C_{12}$ hydrocarbyl group or an unsubstituted $C_1$ to $C_{12}$ hydrocarbyl group, such as methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H.

Alternatively, $R^6$ is —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$, —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternatively, $R^6$ is n-propyl, n-butyl, n-pentyl or n-hexyl.

Alternatively, $R^2$ and $R^7$ are independently —$R^{13}$—$SiR'_3$ or is —$R^{13}$—$CR'_3$ where $R^{13}$ is a $C_1$ to $C_4$ hydrocarbyl (such as $CH_2$, $CH_2CH_2$, (Me)$CHCH_2$, (Me)CH), and each R' is independently hydrogen, or a $C_1$ to $C_{20}$ substituted or unsubstituted hydrocarbyl, such as a substituted $C_1$ to $C_{12}$ hydrocarbyl group or an unsubstituted $C_1$ to $C_{12}$ hydrocarbyl group, such as methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl; alternatively $R^2$ and R' are selected from the group consisting of: —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$, —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

In at least one embodiment, the 2 position of the cyclopentadienyl group or groups, e.g., $R^1$ in formula (I), may be selected from hydrogen, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, or a substituted or unsubstituted phenyl, particularly methyl, ethyl, n-propyl, isopropyl, n-butyl, isobutyl, sec-butyl, tert-butyl, such as hydrogen or methyl.

In at least one embodiment, the 2 position of the cyclopentadienyl group or groups, e.g., $R^1$ in formula (I), is hydrogen.

In at least one embodiment, $R^1$, $R^2$, $R^3$, and $R^4$ are the same or different radicals as described for $R^6$, $R^7$, and $R^8$, but including hydrogen, and where these pairs of substituents can be joined together into saturated, unsaturated or aromatic fused rings.

In at least one embodiment, $R^1$, $R^2$, $R^3$, $R^4$, $R^5$, $R^6$, $R^7$, and $R^8$ of formula (I) may be identical or different and are each a hydrogen atom, a halogen atom, a $C_1$-$C_{10}$ alkyl group (methyl, ethyl, propyl, butyl, pentyl, hexyl, heptyl, octyl, nonyl, decyl, undecyl, dodecyl or an isomer thereof) which may be halogenated, or a $C_6$-$C_{10}$ aryl group which may be halogenated, wherein at least one (preferably at least two, alternately at least 3, 4, 5, 6, 7, or 8) of $R^1$, $R^2$, $R^3$, $R^4$, $R^5$, $R^6$, $R^7$, and $R^8$ is —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl.

In at least one embodiment, $R^1$, $R^2$, $R^3$, $R^4$, $R^5$, $R^6$, $R^7$, and $R^8$ of formula (I) are identical or different and are selected from a hydrogen atom, $C_2$-$C_{20}$ alkyl group (such as $C_3$ to $C_{16}$, such as $C_4$ to $C_{12}$, such as butyl, pentyl, hexyl, heptyl, octyl, nonyl, decyl, undecyl, dodecyl and isomers thereof) which may be halogenated, a $C_6$-$C_{10}$ aryl group which may be halogenated, wherein at least one (preferably at least two, alternately at least 3, 4, 5, 6, 7, or 8) of $R^1$, $R^2$, $R^3$, $R^4$, $R^5$, $R^6$, $R^7$, and $R^8$ is —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl. In some embodiments, $R^1$, $R^2$, $R^3$, $R^4$, $R^5$, $R^6$, $R^7$, and $R^8$ may be the same or different and are each a butyl group, an aryl group, an isopropyl group, or a fluoroalkyl group, particularly wherein each of $R^1$, $R^2$, $R^3$, $R^4$, $R^5$, $R^6$, $R^7$, and $R^8$ is independently selected from the group consisting of methyl, ethyl, propyl, isopropyl, n-propyl, n-butyl-, iso-butyl-, and tert-butyl groups, wherein at least one (preferably at least two, alternately at least 3, 4, 5, 6, 7, or 8) of $R^1$, $R^2$, $R^3$, $R^4$, $R^5$, $R^6$, $R^7$, and $R^8$ is —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl.

In an alternate embodiment, $R^1$, $R^2$, $R^3$, $R^4$, $R^5$, $R^6$, $R^7$, and $R^8$ may be the same or different and are each a methyl group, ethyl group, propyl group, butyl group, an aryl group, an isopropyl group, or a fluoroalkyl group, particularly wherein each of $R^1$, $R^2$, $R^3$, $R^4$, $R^5$, $R^6$, $R^7$, and $R^8$ is independently selected from the group consisting of methyl group, ethyl group, propyl, butyl group, an aryl group, isopropyl, n-propyl, n-butyl-, iso-butyl-, and tert-butyl groups and $R^1$, $R^2$, $R^3$, $R^4$, $R^5$, $R^6$, $R^7$, and $R^8$ may be substituted with —$NR'_2$, —SR', —OR', —$OSiR'_3$, —$CH_2SiR'_3$ or a —$PR'_2$ radical, wherein R' is one of a hydrogen atom, halogen atom, a $C_1$-$C_{10}$ alkyl group, or a $C_6$-$C_{10}$ aryl group, wherein at least one of $R^1$, $R^2$, $R^3$, $R^4$, $R^5$, $R^6$, $R^7$, and $R^8$ is —$CH_2SiR'_3$ wherein R' is a $C_1$-$C_{10}$ alkyl group, particularly methyl group, ethyl group, propyl, butyl group, an aryl group, isopropyl, n-propyl, n-butyl-, iso-butyl-, and tert-butyl groups, most particularly methyl group.

In some embodiments, $R^1$ and $R^5$ is a —$CH_2SiR'_3$ group, wherein R' is one of a hydrogen atom, halogen atom, a $C_1$-$C_{10}$ alkyl group, or a $C_6$-$C_{10}$ aryl group, and each of $R^2$, $R^3$, $R^4$, $R^6$, $R^7$, and $R^8$ is a hydrogen atom.

In another embodiment, $R^1$ and $R^6$ is a —$CH_2SiR'_3$ group, wherein R' is one of a hydrogen atom, halogen atom, a $C_1$-$C_{10}$ alkyl group, or a $C_6$-$C_{10}$ aryl group, and each of $R^2$, $R^3$, $R^4$, $R^5$, $R^7$, and $R^8$ is a hydrogen atom.

In another embodiment, $R^2$ and $R^5$ is a —$CH_2SiR'_3$ group, wherein R' is one of a hydrogen atom, halogen atom, a $C_1$-$C_{10}$ alkyl group, or a $C_6$-$C_{10}$ aryl group, and each of $R^1$, $R^3$, $R^4$, $R^6$, $R^7$, and $R^8$ is a hydrogen atom.

In another embodiment, $R^2$ and $R^6$ is a —$CH_2SiR'_3$ group, wherein R' is one of a hydrogen atom, halogen atom, a $C_1$-$C_{10}$ alkyl group, or a $C_6$-$C_{10}$ aryl group, and each of $R^1$, $R^3$, $R^4$, $R^5$, $R^7$, and $R^8$ is a hydrogen atom.

In yet another embodiment, $R^1$, $R^2$, $R^3$, $R^4$, $R^5$, $R^6$, $R^7$, and $R^8$ is independently a hydrogen atom or a substituted or unsubstituted, branched or unbranched $C_1$-$C_{20}$ alkyl group, such as a $C_2$-$C_{20}$ alkyl group, wherein at least one (preferably at least two, alternately at least 3, 4, 5, 6, 7, or 8) of $R^1$, $R^2$, $R^3$, $R^4$, $R^5$, $R^6$, $R^7$, and $R^8$ is —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl.

In another embodiment, $R^1$, $R^2$, $R^3$, $R^4$ is independently a substituted or unsubstituted, branched or unbranched $C_1$-$C_{20}$ alkyl group, such as a $C_2$-$C_{20}$ alkyl group, and $R^5$ is a —$CH_2SiR'_3$ group, and $R^6$, $R^7$, and $R^8$ is a hydrogen atom.

In another embodiment, each of $R^1$, $R^2$, $R^3$, and $R^4$ is independently a substituted or unsubstituted, branched or unbranched $C_1$-$C_{20}$ alkyl group, such as a $C_2$-$C_{20}$ alkyl group and $R^6$ is a —$CH_2SiR'_3$ group, and each of $R^5$, $R^7$, and $R^8$ is a hydrogen atom.

In yet another embodiment, at least one (preferably at least two, alternately at least 3, or 4) of $R^1$, $R^2$, $R^3$, $R^4$ is independently —$R^{13}$—$SiR'_3$ or —$R^{13}$—$CR'_3$ and at least one (preferably at least two, alternately at least 3, or 4) of $R^5$, $R^6$, $R^7$, and $R^8$ is independently —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl.

Alternatively, each $X_1$ and $X_2$ may be independently a halide, a hydride, an alkyl group, an alkenyl group or an arylalkyl group.

Alternatively, each $X_1$ and $X_2$ is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, ($X_1$ and $X_2$ may form a part of a fused ring or a ring system), such as each $X_1$ and $X_2$ is independently selected from halides, aryls and $C_1$ to $C_5$ alkyl groups, such as each $X_1$ and $X_2$ is a phenyl, methyl, ethyl, propyl, butyl, pentyl, or chloro group.

Alternatively, $X^1$ and $X^2$ may also be joined together to form an alkanediyl group or a conjugated $C_4$-$C_{40}$ diene ligand which is coordinated to M in a metallocyclopentene fashion; $X^1$ and $X^2$ may also be identical or different conjugated dienes, optionally substituted with one or more hydrocarbyl, tri (hydrocarbyl) silyl groups or tri (hydrocarbyl) silylhydrocarbyl groups, said dienes having up to 30 atoms not counting hydrogen and forming a π-complex with M.

Exemplary groups suitable for $X^1$ and or $X^2$ include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,4-ditolyl-1,3-butadiene, 1,4-bis (trimethylsilyl)-1,3-butadiene, and 1,4-dinaphthyl-1,3-butadiene; such as $X^1$ and $X^2$ are identical and are a $C_1$-$C_3$ alkyl or alkoxy group, a $C_6$-$C_{10}$ aryl or aryloxy group, a $C_2$-$C_4$ alkenyl group, a $C_7$-$C_{10}$ arylalkyl group, a $C_7$-$C_{12}$ alkylaryl group, or a halogen atom, such as chlorine.

In at least one embodiment, T is a bridging group containing at least one Group 13, 14, 15, or 16 element, in particular boron or a Group 14, 15, or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Examples for the bridging group T include $CH_2$, $CH_2CH_2$, $SiMe_2$, $SiPh_2$, $Si(Me)_2Si(Me)_2$, SiMePh, $Si(CH_2)_3$, $Si(CH_2)_4$, O, S, NPh, PPh, NMe, PMe, NEt, NPr, NBu, PEt, PPr, $Me_2SiOSiMe_2$, and PBu. In at least one embodiment of the present disclosure in an embodiment of any formula described herein, T is represented by the formula $ER^d_2$ or $(ER^d_2)_2$, where E is C, Si, or Ge, and each $R^d$ is independently hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^d$ can form a cyclic structure including aromatic, partially saturated, or saturated cyclic or fused ring system. For example, T can be a bridging group comprising carbon or silica, such as dialkylsilyl, such as T is independently selected from $CH_2$, $CH_2CH_2$, $C(CH_3)_2$, $Si_2Me_4$, $SiMe_2$, cyclotrimethylenesilylene (Si$(CH_2)_3$), cyclopentamethylenesilylene (Si$(CH_2)_5$) and cyclotetramethylenesilylene (Si$(CH_2)_4$).

Useful asymmetric catalysts can have a mirror plane that cannot be drawn through the metal center and the cyclopentadienyl moieties bridged to the metal center can be structurally different.

In at least one embodiment, a catalyst compounds represented by formula (I) can be one or more of: rac/meso-$Me_4Si_2$(3-$Me_3Si$—$CH_2$-Cp)$_2$Hf$Me_2$; rac-$Me_4Si_2$(3-$Me_3Si$—$CH_2$-Cp)$_2$Hf$Me_2$; rac/meso-$Me_2Si$(3-$Me_3Si$—$CH_2$-Cp)$_2$Hf$Me_2$; rac-$Me_2Si$(3-$Me_3Si$—$CH_2$-Cp)$_2$Hf$Me_2$; rac/meso-$Ph_2Si$(3-$Me_3Si$—$CH_2$-Cp)$_2$Hf$Me_2$; rac/meso-PhMeSi(3-$Me_3Si$—$CH_2$-Cp)$_2$Hf$Me_2$; rac/meso-$(CH_2)_4Si$(3-$Me_3Si$—$CH_2$-Cp)$_2$Hf$Me_2$; rac/meso-$(CH_2)_3Si$(3-$Me_3Si$—$CH_2$-Cp)$_2$Hf$Me_2$; Me(H)Si(3-$Me_3Si$—$CH_2$-Cp)$_2$Hf$Me_2$; Ph(H)Si(3-$Me_3Si$—$CH_2$-Cp)$_2$Hf$Me_2$; rac/meso-(biphenyl)$_2$Si(3-$Me_3Si$—$CH_2$-Cp)$_2$Hf$Me_2$; rac/meso-(F—$C_6H_4$)$_2$Si(3-$Me_3Si$—$CH_2$-Cp)$_2$Hf$Me_2$; rac/meso-$Me_2Ge$(3-$Me_3Si$—$CH_2$-Cp)$_2$Hf$Me_2$; rac-$Me_2Ge$(3-$Me_3Si$—$CH_2$-Cp)$_2$Hf$Me_2$; rac/meso-$Ph_2Ge$(3-$Me_3Si$—$CH_2$-Cp)$_2$Hf$Me_2$; $Me_4Si_2$ (Me₄Cp)(3-Me₃Si—CH₂-Cp)HfMe₂; Me₂Si(Me₄Cp)(3-Me₃Si—CH₂-Cp)HfMe₂; Ph₂Si(Me₄Cp)(3-Me₃Si—CH₂-Cp)HfMe₂; Me₂Ge(Me₄Cp)(3-Me₃Si—CH₂-Cp)HfMe₂; Ph₂Ge(Me₄Cp)(3-Me₃Si—CH₂-Cp)HfMe₂; PhMeSi (Me₄Cp)(3-Me₃Si—CH₂-Cp)HfMe₂; (CH₂)₃Si(Me₄Cp)(3-Me₃Si—CH₂-Cp)HfMe₂; (CH₂)₄Si(Me₄Cp)(3-Me₃Si—CH₂-Cp)HfMe₂; Et₂Si(Me₄Cp)(3-Me₃Si—CH₂-Cp)HfMe₂; Et₂Si(Me₄Cp)(3-CH₂—SiMe₃-Cp)HfMe₂; SiMe₂ (EtMe₃Cp)(3-CH₂—SiMe₃-Cp)HfMe₂; SiMe₂(Me₄Cp)(3-CH₂—SiPhMe₂-Cp)HfMe₂; Si₂Me₄(Me₄Cp)(3-CH₂—SiPhMe₂-Cp)HfMe₂; SiPh₂(Me₄Cp)(3-CH₂—SiPhMe₂-Cp) HfMe₂; Me₂Ge(Me₄Cp)(3-CH₂—SiPhMe₂)HfMe₂; Ph₂Ge (Me₄Cp)(3-CH₂—SiPhMe₂)HfMe₂; PhMeSi(Me₄Cp)(3-CH₂—SiPhMe₂-Cp)HfMe₂; Et₂Si(Me₄Cp)(3-CH₂—SiPhMe₂-Cp)HfMe₂; SiMe₂(EtMe₃Cp)(3-CH₂—SiPh₃-Cp) HfMe₂; Si₂Me₄(EtMe₃Cp)(3-CH₂—SiPh₃-Cp)HfMe₂; SiMe₂(Me₄Cp)(3-CH₂—SiPh₃-Cp)HfMe₂; SiPh₂(Me₄Cp) (3-CH₂—SiPh₃-Cp)HfMe₂; Me₂Ge(Me₄Cp)(3-CH₂—SiPh₃)HfMe₂; Ph₂Ge(Me₄Cp)(3-CH₂—SiPh₃)HfMe₂; PhMeSi(Me₄Cp)(3-CH₂—SiPh₃-Cp)HfMe₂; Et₂Si(Me₄Cp) (3-CH₂—SiPh₃-Cp)HfMe₂; SiMe₂(EtMe₃Cp)(3-CH₂—SiPh₃-Cp)HfMe₂; SiMe₂(2-Me,3-CH₂—SiMe₃-Ind)₂ HfMe₂; Si₂Me₄(2-Me,3-CH₂—SiMe₃-Ind)₂HfMe₂; SiPh₂ (2-Me,3-CH₂—SiMe₃-Ind)₂HfMe₂; GeMe₂(2-Me,3-CH₂—SiMe₃-Ind)₂HfMe₂; GePh₂(2-Me,3-CH₂—SiMe₃-Ind)₂ HfMe₂; SiPhMe(2-Me,3-CH₂—SiMe₃-Ind)₂HfMe₂; Et₂Si (2-Me,3-CH₂—SiMe₃-Ind)₂HfMe₂; SiMe₂(2-Me,3-CH₂—SiPhMe₂-Ind)₂HfMe₂; Si₂Me₄(2-Me,3-CH₂—SiPhMe₂-Ind)₂HfMe₂; SiPh₂(2-Me,3-CH₂—SiPhMe₂-Ind)₂HfMe₂; GeMe₂(2-Me,3-CH₂—SiPhMe₂-Ind)₂HfMe₂; GePh₂(2-Me,3-CH₂—SiPhMe₂-Ind)₂HfMe₂; SiPhMe(2-Me,3-CH₂—SiPhMe₂-Ind)₂HfMe₂; Et₂Si(2-Me,3-CH₂—SiPhMe₂-Ind)₂ HfMe₂; SiMe₂(2-Me,3-CH₂—SiPh₃-Ind)₂HfMe₂; Si₂Me₄ (2-Me,3-CH₂—SiPh₃-Ind)₂HfMe₂; SiPh₂(2-Me,3-CH₂—SiPh₃-Ind)₂HfMe₂; GeMe₂(2-Me,3-CH₂—SiPh₃-Ind)₂ HfMe₂; GePh₂(2-Me,3-CH₂—SiPh₃-Ind)₂HfMe₂; SiPhMe (2-Me,3-CH₂—SiPh₃-Ind)₂HfMe₂; Et₂Si(2-Me,3-CH₂—SiPh₃-Ind)₂HfMe₂, and the alkyl or halide versions thereof, such as Me₂ is substituted with Et₂, C₁₂, Br₂, I₂, or Ph₂.

In at least one embodiment, a catalyst compound is rac-tetramethylsilyl-bis(trimethylsilylmethylcyclopentadienyl) hafnium dimethyl or meso-tetramethylsilyl-bis(trimethylsilylmethylcyclopentadienyl) hafnium dimethyl.

Likewise, while the dimethyl-substituted compounds —Hf(CH₃)₂ are enumerated above, the compounds where each of the methyl groups are replaced with chloride atoms (e.g., —HfCl₂, —Zr(CH₃)₂), and —ZrCl₂) are also expressly disclosed.

In particular embodiments, the rac/meso ratio of the metallocene catalyst is 90:1 or greater, or 80:1 or greater, or 70:1 or greater, or 60:1 or greater, or 50:1 or greater, or 40:1 or greater, or 30:1 or greater, or 20:1 or greater, or 15:1 or greater, or 10:1 or greater, or 7:1 or greater, or 5:1 or greater.

In one aspect, an advantage is provided in that the separation of meso from rac isomers is not performed after synthesis of the catalysts of the present disclosure. In certain aspects, the meso isomer is formed in a ratio of 99.9:0.1 or greater than the rac isomer.

Amounts of rac and meso isomers are determined by $^1$H NMR.

In at least one embodiment in any of the processes described herein, one catalyst compound is used, e.g., the catalyst compounds are not different. For purposes of the present disclosure one metallocene catalyst compound is considered different from another if they differ by at least one atom. For example, "biscyclopentadienyl hafnium dichloride" is different from "(cyclopentadienyl)(2-methylcyclopentadienyl) hafnium dichloride" which is different from "(cyclopentadienyl)(2-methylcyclopentadienyl) zirconium dichloride." Catalyst compounds that differ only by isomer are considered the same for purposes if the present disclosure, e.g., rac-dimethylsilylbis(2-methyl 4-phenyl) hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are chosen such that the two are compatible. A simple screening method such as by $^1$H or $^{13}$C NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an $X^1$ or $X^2$ ligand which is not a hydride, hydrocarbyl, or substituted hydrocarbyl, then the alumoxane should be contacted with the transition metal compounds prior to addition of the non-coordinating anion activator.

Methods to Prepare the Catalyst Compounds of Formula (I)

The following is a generic scheme to prepare the catalysts described herein and further exemplified in the examples. Generally, metallocenes of this type are synthesized as shown below where (i) is a deprotonation via a metal salt of alkyl anion (e.g., nBuLi) to form an cyclopentadienide; (ii) reaction of cyclopentadienide with an appropriate bridging precursor (e.g., ClMe₂SiSiMe₂C₁); (iii) double deprotonation via an alkyl anion (e.g., nBuLi) to form a dianion; (iv) reaction of the dianion with a metal halide (e.g., HfCl₄); (v) is an alkylation reaction with a Grignard reagent (e.g., Me₃MgBr); and (v). The final products are obtained by crystallization separation of the crude solids.

Unbridged Metallocenes

Unbridged hafnium metallocenes useful herein are further represented by the formula (II): $(Ind)_s(Cp)_mM'X_q$, wherein: M' is a Hf; Ind is an indenyl group substituted with 1, 2, 3, 4, 5, 6, or 7 hydrocarbyl or substituted hydrocarbyl groups; Cp is a cyclopentadienyl group substituted with 4 or 5 hydrocarbyl or substituted hydrocarbyl groups; each X is, independently, a leaving group; s is 1 or 2; m is 0 or 1; s+m is 2; q is 0, 1, or 2; and s+m+q is 3 or 4.

In an embodiment each X may be independently a halide, a hydride, an alkyl group, an alkenyl group or an arylalkyl group.

Alternately, each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), such as each X is independently selected from halides, aryls and $C_1$ to $C_5$ alkyl groups, such as each X is a phenyl, methyl, ethyl, propyl, butyl, pentyl, or chloro group.

Independently, each Cp group is substituted with a combination of 4 or 5 substituent groups R. Non-limiting examples of substituent groups R include one or more from the group selected from linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In at least one embodiment, substituent groups R have up to 50 non-hydrogen atoms, such as from 1 to 30 carbon that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, such as two adjacent R groups, may be joined to form a ring structure having from 3 to 30 atoms selected from carbon, nitrogen, oxygen, phosphorus, silicon, germanium, aluminum, boron or a combination thereof.

In an embodiment of the Cp group, the substituent(s) R are independently hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S and or P heteroatom or heteroatom containing group (such as having up to 12 atoms, including the N, O, S and P heteroatoms).

Independently, each Ind group is substituted with a combination of 1, 2, 3, 4, 5, 6, or 7 substituent groups R. Non-limiting examples of substituent groups R include one or more from the group selected from linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In at least one embodiment, substituent groups R have up to 50 non-hydrogen atoms, such as from 1 to 30 carbon that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, such as two adjacent R groups, may be joined to form a ring structure having from 3 to 30 atoms selected from carbon, nitrogen, oxygen, phosphorus, silicon, germanium, aluminum, boron or a combination thereof.

In an embodiment of the Ind group, the substituent(s) R are independently hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S and or P heteroatom or heteroatom containing group (such as having up to 12 atoms, including the N, O, S and P heteroatoms).

In at least one embodiment, the unbridged metallocene catalyst compound represented by formula (I) is represented by formula (IV):

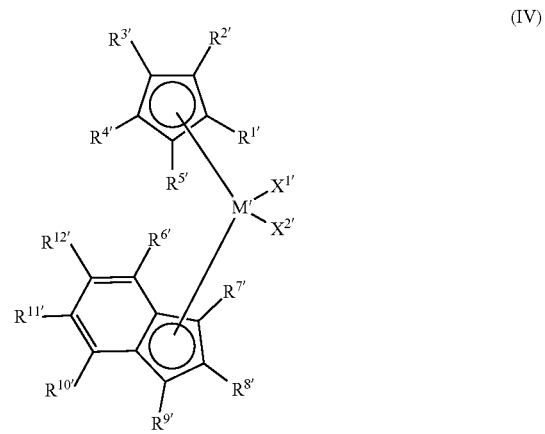

(IV)

wherein:
M' is Hf;
each of $X^{1'}$ and $X^{2'}$ is independently a univalent anionic ligand, a diene ligand, an alkylidene ligand, or $X^{1'}$ and $X^{2'}$ are joined to form a metallocyclic ring,
each of $R^{1'}$, $R^{2'}$, $R^{3'}$, $R^{4'}$, $R^{5'}$, $R^{6'}$, $R^{7'}$, $R^{8'}$, $R^{9'}$, $R^{10'}$, $R^{11'}$, and $R^{12'}$ is independently hydrogen, alkoxide, $C_1$ to $C_{40}$ substituted or unsubstituted hydrocarbyl, or —R"—SiR'$_3$ or —R"—CR'$_3$ where R" is $C_1$ to $C_4$ hydrocarbyl, and each R' is independently $C_1$ to $C_{20}$ substituted or unsubstituted hydrocarbyl; or at least one of $R^{1'}$ and $R^{2'}$, $R^{2'}$ and $R^{3'}$, $R^{3'}$ and $R^{4'}$, $R^{4'}$ and $R^{5'}$, $R^{5'}$ and $R^{1'}$ is combined to form:

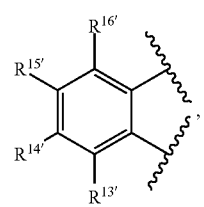

, wherein each of $R^{13'}$, $R^{14'}$, $R^{15'}$, and $R^{16'}$ is independently hydrogen, alkoxide, $C_1$ to $C_{40}$ substituted or unsubstituted hydrocarbyl, or —R"—SiR'$_3$ or —R"—CR'$_3$ where R" is $C_1$ to $C_4$ hydrocarbyl, and each R' is independently $C_1$ to $C_{20}$ substituted or unsubstituted hydrocarbyl, wherein:

1) at least 1 (alternately at least 2, 3, 4, 5, 6, or 7) of $R^{6'}$, $R^{7'}$, $R^{8'}$, $R^{9'}$, $R^{10'}$, $R^{11'}$, $R^{12'}$ is not H; and 2) at least 4 of $R^{1'}$, $R^{2'}$, $R^{3'}$, $R^{4'}$, and $R^{5'}$ are not hydrogen when two adjacent R groups ($R^{1'}$ and $R^{2'}$, $R^{2'}$ and $R^{3'}$, $R^{3'}$ and $R^{4'}$, $R^{4'}$ and $R^{5'}$, $R^{5'}$ and $R^{1'}$) are not combined to form a ring; and 3) when two adjacent R groups are combined to form:

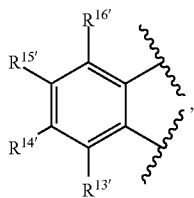

then at least one (alternately at least two) of the remaining R groups is not H (for example, if $R^{1'}$ and $R^{2'}$, form

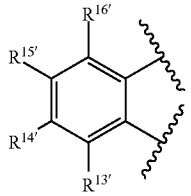

then at least one of the remaining R groups, $R^{3'}$, $R^{4'}$, $R^{5'}$, $R^{6'}$, $R^{13'}$, $R^{14'}$, $R^{15'}$, and $R^{16'}$, is not H).

In at least one embodiment, each of $R^{1'}$, $R^{2'}$, $R^{3'}$, $R^{4'}$, and $R^{5'}$ is $C_1$ to $C_{20}$ alkyl and $R^{9'}$ is $C_1$ to $C_{20}$ alkyl. In at least one embodiment, each of $R^{1}$, $R^{2'}$, $R^{3'}$, $R^{4'}$, and $R^{5'}$ is methyl and $R^{9'}$ is methyl.

In at least one embodiment, $R^{3'}$ and $R^{4'}$ are combined to form

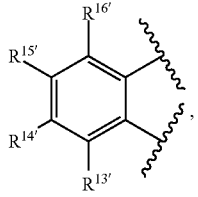

wherein each of $R^{2'}$, $R^{13'}$, $R^{14'}$, $R^{15'}$, and $R^{16'}$ is independently hydrogen, alkoxide, or $C_1$ to $C_{40}$ substituted or unsubstituted hydrocarbyl, and each of $R^{6'}$, $R^{7'}$, $R^{8'}$, $R^{9'}$, $R^{10'}$, $R^{11'}$, and $R^{12'}$ is independently hydrogen, alkoxide, or $C_1$ to $C_{40}$ substituted or unsubstituted hydrocarbyl.

In at least one embodiment, $R^{3'}$ and $R^{4'}$ are combined to form

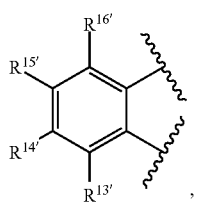

wherein each of $R^{2'}$, $R^{14'}$ and $R^{15'}$ is independently $C_1$ to $C_{40}$ substituted or unsubstituted hydrocarbyl, each of $R^{1'}$, $R^{5'}$, $R^{13'}$ and $R^{16'}$ is hydrogen, each of $R^{7'}$, $R^{11'}$, and $R^{12'}$ is independently $C_1$ to $C_{40}$ substituted or unsubstituted hydrocarbyl; and each of $R^{6'}$, $R^{8'}$, $R^{9'}$, and $R^{10'}$ is hydrogen. In at least one embodiment, each of $R^{2'}$, $R^{7'}$, $R^{11'}$, $R^{2'}$, $R^{14'}$, $R^{15'}$ is independently $C_1$ to $C_{10}$ unsubstituted hydrocarbyl. In at least one embodiment, each of $R^{2'}$, $R^{7'}$, $R^{11'}$, $R^{12'}$, $R^{14'}$, $R^{15'}$ is methyl.

Exemplary unbridged metallocene compounds include:
rac/meso-bis(1-methylindenyl)hafnium dichloride;
rac/meso-bis(1-ethylindenyl)hafnium dichloride;
rac/meso-bis(1-methylindenyl)hafnium dimethyl;
rac/meso-bis(1-ethylindenyl)hafnium dimethyl;
rac/meso-bis(1-propylindenyl)hafnium dichloride;
rac/meso-bis(1-propylindenyl)hafnium dimethyl;
rac/meso-bis(1-butylindenyl)hafnium dichloride;
rac/meso-bis(1-butylindenyl)hafnium dimethyl;
(1-methylindenyl)(pentamethyl cyclopentadienyl) hafnium dimethyl;
(1-methylindenyl)(pentamethyl cyclopentadienyl) hafnium dichloride;
(1-methylindenyl)(tetramethyl cyclopentadienyl) hafnium dimethyl;
(1-methylindenyl)(tetramethyl cyclopentadienyl) hafnium dichloride;
bis(1,5,6-trimethylindenyl)hafnium dichloride; and
bis(1,5,6-trimethylindenyl)hafnium dimethyl.

In a preferred embodiment, the catalyst compound is bis(1,5,6-trimethylindenyl)hafnium dihalide (where halide is, independently, Cl, F, I, Br) or bis(1,5,6-trimethylindenyl) hafnium dialkyl (where alkyl is, independently, $C_1$ to $C_{30}$ alkyl).

Unbridged metallocenes of the present disclosure can be prepared in a similar manner as the metallocenes disclosed in U.S. Pat. Nos. 7,179,876; 7,169,864; 7,157,531; 7,129, 302; 6,995,109; 6,958,306; 6,884,748; 6,689,847; US Publication 2007/0055028, and PCT Publications WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; US Publication 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Support Material

In embodiments of the present disclosure, the catalyst systems can comprise a support material. For example, the support material can be a porous support material, for example, talc, and inorganic oxides. Other support materials include zeolites, clays, organoclays, or any other organic or inorganic support material, or mixtures thereof. As used herein, "support" and "support material" are used interchangeably.

For example, the support material can be an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Suitable support materials include $Al_2O_3$, $ZrO_2$, $SiO_2$, and combinations thereof, such as, $SiO_2$, $Al_2O_3$, or $SiO_2/Al_2O_3$.

For example, the support material, such as an inorganic oxide, has a surface area in the range of from about 10 $m^2/g$ to about 700 $m^2/g$, pore volume in the range of from about 0.1 cc/g to about 4.0 cc/g, and average particle size in the range of from about 5 μm to about 500 μm, such as, the surface area of the support material is in the range of from about 50 $m^2/g$ to about 500 $m^2/g$, pore volume of from about 0.5 cc/g to about 3.5 cc/g, and average particle size of from about 10 μm to about 200 μm, such as the surface area of the support material is in the range of from about 100 $m^2/g$ to about 400 $m^2/g$, pore volume from about 0.8 cc/g to about 3.0 cc/g, and average particle size is from about 5 μm to about 100 μm. The average pore size of the support material useful in at least one embodiment of the present disclosure is in the range of from 10 to 1,000 Å, such as 50 to about 500 Å, such as 75 to about 350 Å. In some embodiments, the support material is a high surface area, amorphous silica (surface area ≥300 $m^2/gm$, pore volume ≥1.65 $cm^3/gm$), and is marketed under the tradenames of DAVISON 952 or DAVISON 955 by the Davison Chemical Division of W. R. Grace and Company, are particularly useful. In other embodiments, DAVIDSON 948 is used.

In at least one embodiment of the present disclosure, the support material may be dry, that is, free of absorbed water. Drying of the support material can be achieved by heating or calcining at about 100° C. to about 1,000° C., such as at least about 600° C. When the support material is silica, it is heated to at least 200° C., such as about 200° C. to about 850° C., such as about 600° C.; and for a time of about 1 minute to about 100 hours, from about 12 hours to about 72 hours, or from about 24 hours to about 60 hours. The calcined support material can have at least some reactive hydroxyl (OH) groups.

In at least one embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternatively from 0.19 to 19 wt %, alternatively from 0.6 to 3.5 wt %, based upon the weight of the support.

The above two metal catalyst components described herein are generally deposited on the support material at a loading level of 10-100 micromoles of metal per gram of solid support; alternatively 20-80 micromoles of metal per gram of solid support; or 40-60 micromoles of metal per gram of support. But greater or lesser values may be used provided that the total amount of solid complex does not exceed the support's pore volume.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment of the present disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Non-limiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activators

The catalyst systems may be formed by combining the above two metal catalyst components with activators in any manner known from the literature including by supporting them for use in slurry or gas phase polymerization. Activators are defined to be any compound which can activate any one of the catalyst compounds described above by converting the neutral metal catalyst compound to a catalytically active metal catalyst compound cation. Non-limiting activators, for example, include alumoxanes, aluminum alkyls, ionizing activators, which may be neutral or ionic, and conventional-type cocatalysts. Suitable activators can include alumoxane compounds, modified alumoxane compounds, and ionizing anion precursor compounds that abstract a reactive, σ-bound, metal ligand making the metal catalyst compound cationic and providing a charge-balancing non-coordinating or weakly coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), in at least one embodiment, the upper amount of activator can be up to a 5,000-fold molar excess Al/M over the catalyst compound (per metal catalytic site). The minimum activator-to-catalyst-compound is a 1:1 molar ratio. Alternate suitable ranges can include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. For instance, alumoxane can be present at zero mol %, alternatively the alumoxane is present at a molar ratio of aluminum to catalyst compound transition metal less than 500:1, such as less than 300:1, such as less than 100:1, such as less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions can include those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

For descriptions of useful activators please see U.S. Pat. Nos. 8,658,556 and 6,211,105.

Suitable activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$$^-$], 1-(4-(tris(pentafluorophenyl)borate)-2,3,5,6-tetrafluorophenyl)pyrrolidinium; and [Me$_3$NH$^+$][B(C$_6$F$_5$)$_4$$^-$], 1-(4-(tris(pentafluorophenyl)borate)-2,3,5,6-tetrafluorophenyl) pyrrolidinium; and sodium tetrakis(pentafluorophenyl)borate, potassium tetrakis(pentafluorophenyl)borate, 4-(tris(pentafluorophenyl)borate)-2,3,5,6-tetrafluoropyridinium, solidium tetrakis(perfluorophenyl)aluminate, potassium tetrakis(pentafluorophenyl), and N,N-dimethylanilinium tetrakis(perfluorophenyl)aluminate.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

Suitable activator-to-catalyst ratio, e.g., all NCA activators-to-catalyst ratio can be about a 1:1 molar ratio. Alternate suitable ranges can include from 0.1:1 to 100:1, alternatively from 0.5:1 to 200:1, alternatively from 1:1 to 500:1 alternatively from 1:1 to 1000:1. A particularly useful range is from 0.5:1 to 10:1, such as 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, diethyl zinc, tri-n-butylaluminum, diisobutylaluminum hydride, or combinations thereof.

In some embodiments, the catalyst systems will additionally comprise one or more scavenging compounds. Here, the term "scavenger" means a compound that removes polar impurities from the reaction environment. These impurities adversely affect catalyst activity and stability. For example, the scavenging compound will be an organometallic compound such as the Group-13 organometallic compounds of U.S. Pat. Nos. 5,153,157; 5,241,025; and PCT Publication Nos. WO 91/09882; WO 94/03506; WO 93/14132; and WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, such as bulky compounds, such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=C$_6$F$_5$).

Suitable aluminum scavengers can include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula (($R_z$—Al—)$_y$O—)$_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two metal catalysts can be combined to form a mixed catalyst system.

The two or more metal catalyst compounds can be added together in a desired ratio when combined, contacted with an activator, or contacted with a support material or a supported activator. The metal catalyst compounds may be added to the mixture sequentially or at the same time. The ratio of catalyst (I):(II) can vary depending on the balance of processability versus physical characteristics of the desired polymer. For example, the ratio (I):(II) can range from 1:10 to 10:1, such as 5:1 to 1:5 or 1:1.

More complex procedures are possible, such as addition of a first metal catalyst compound to a slurry including a support or a supported activator mixture for a specified reaction time, followed by the addition of the second metal catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal catalyst compound may be supported via contact with a support material for a reaction time. The resulting supported catalyst composition may then be mixed with mineral oil to form a slurry, which may or may not include an activator. The slurry may then be admixed with a second metal catalyst compound prior to introduction of the resulting mixed catalyst system to a polymerization reactor. The second metal catalyst compounds may be admixed at any point prior to introduction to the reactor, such as in a polymerization feed vessel or in-line in a catalyst delivery system.

The mixed catalyst system may be formed by combining a first metal catalyst compound (for example a metal catalyst compound useful for producing a first polymer attribute, such as a high molecular weight polymer fraction or high comonomer content) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal catalyst compound, followed by, or simultaneous to combining with a second metal catalyst compound (for example, a metal catalyst compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal catalyst compound in a slurry, the slurry comprising mineral or silicon oil, with a second metal catalyst compound that is not supported and not combined with additional activator, where the second metal catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189247 (J. H. Lippincott, D. R. Smith, K. Kish & B. Gordon eds. Lippincott & Peto Inc. 2001). Suitable mineral and silicon oils can be those that exclude moieties that are reactive with metallocene catalysts, examples of which include hydroxyl and carboxyl groups.

The diluent may comprise a blend of a mineral, silicon oil, and/or a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal catalyst compound is combined with an activator and a first diluent to form a catalyst slurry that is then combined with a support material. Until such contact is made, the support particles are not previously activated. The first metal catalyst compound can be in any desirable form such as a dry powder, suspension in a diluent, solution in a diluent, liquid, etc. The catalyst slurry and support particles are then mixed thoroughly, in one embodiment at an elevated temperature, so that both the first metal catalyst compound and the activator are deposited on the support particles to form a support slurry.

After the first metal catalyst compound and activator are deposited on the support, a second metal catalyst compound may then be combined with the supported first metal catalyst compound, wherein the second is combined with a diluent comprising mineral or silicon oil by any suitable means either before, simultaneous to, or after contacting the second metal catalyst compound with the supported first metal catalyst compound. In one embodiment, the first metal catalyst compound is isolated form the first diluent to a dry state before combining with the second metal catalyst compound. For instance, the second metal catalyst compound is not activated, that is, not combined with any activator, before being combined with the supported first metal catalyst compound. The resulting solids slurry (including both the supported first and second metal catalyst compounds) can be then mixed thoroughly at an elevated temperature.

A wide range of mixing temperatures may be used at various stages of making the mixed catalyst system. For example, in a specific embodiment, when the first metal catalyst compound and at least one activator, such as methylalumoxane, are combined with a first diluent to form a mixture, the mixture can be heated to a first temperature of from 25° C. to 150° C., such as from 50° C. to 125° C., such as from 75° C. to 100° C., such as from 80° C. to 100° C. and stirred for a period of time from 30 seconds to 12 hours, such as from 1 minute to 6 hours, such as from 10 minutes to 4 hours, such as from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., such as greater than 70° C., such as greater than 80° C., such as greater than 85° C., for a period of time from 30 seconds to 12 hours, such as from 1 minute to 6 hours, such as from 10 minutes to 4 hours, such as from 30 minutes to 3 hours. For example, the support slurry can be mixed for a time sufficient to provide a collection of activated support particles that have the first metal catalyst compound deposited thereto. The first diluent can then be removed from the first support slurry to provide a dried supported first catalyst compound. For example, the first diluent can be removed under vacuum or by nitrogen purge.

Next, the second metal catalyst compound is combined with the activated first metal catalyst compound in the presence of a diluent comprising mineral or silicon oil in one embodiment. For example, the second metal catalyst compound can be added in a molar ratio to the first metal catalyst compound in the range from 1:1 to 3:1. For example, the molar ratio can be approximately 1:1. The resultant slurry (or first support slurry) can be heated to a first temperature from 25° C. to 150° C., such as from 50° C. to 125° C., such as from 75° C. to 100° C., such as from 80° C. to 100° C. and stirred for a period of time from 30 seconds to 12 hours, such as from 1 minute to 6 hours, such as from 10 minutes to 4 hours, such as from 30 minutes to 3 hours.

The first diluent is an aromatic or alkane, such as a hydrocarbon diluent having a boiling point of less than 200° C. such as toluene, xylene, hexane, etc., may be removed from the supported first metal catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment. The metallocene compound may be the first or second compound, such as the second compound.

Polymerization Process

In embodiments herein, the present disclosure provides polymerization processes where monomer (such as ethylene), and, optionally, comonomer (such as hexene), are contacted with a catalyst system comprising a hafnium metallocene compound represented by formula (I), an unbridged hafnium metallocene compound represented by formula (II), an activator, and a support material as described above.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment of the present disclosure, the monomers comprise ethylene and, optional, comonomers comprising one or more $C_3$ to $C_{40}$ olefins, such as $C_4$ to $C_{20}$ olefins, or such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In at least one embodiment one or more dienes are present in the polymer produced herein at up to 10 wt %, such as at 0.00001 to 1.0 wt %, such as 0.002 to 0.5 wt %, such as 0.003 to 0.2 wt %, based upon the total weight of the composition. In at least one embodiment, 500 ppm or less of diene is added to the polymerization, such as 400 ppm or less, such as or 300 ppm or less. In other embodiments, at least 50 ppm of diene is added to the polymerization, or 100 ppm or more, or 150 ppm or more.

Suitable diolefin monomers useful in the present disclosure include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). Suitable diolefin monomers can be selected from alpha, omega-diene monomers (i.e., di-vinyl monomers). For example, the diolefin monomers can be linear di-vinyl monomers, such as those containing from 4 to 30 carbon atoms. Examples of suitable dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly suitable dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Suitable cyclic dienes can include cyclopentadiene, vinylnorbornene, norbornadiene, ethylidene norbornene, divinylbenzene, dicyclopentadiene or higher ring containing diolefins with or without substituents at various ring positions.

In at least one embodiment, a process provides polymerization of ethylene and at least one comonomer having from 3 to 8 carbon atoms, such as 4 to 8 carbon atoms. Particularly, the comonomers are propylene, 1-butene, 4-methyl-1-pentene, 3-methyl-1-pentene, 1-hexene and 1-octene, such as 1-hexene, 1-butene and 1-octene.

In at least one embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of the present disclosure can be carried out in any manner known in the art. Any suspension, homogeneous, bulk, solution, slurry, or gas phase polymerization process known in the art can be used. Such processes can be run in a batch, semi-batch, or continuous mode. Suitable polymerization processes can be gas phase polymerization processes and slurry processes. (A suitable homogeneous polymerization process can be a process where at least 90 wt % of the product is soluble in the reaction media.) A suitable bulk homogeneous process can be used. (A bulk process can be a process where monomer concentration in all feeds to the reactor is 70 volume % or more.) Alternatively, no solvent or diluent is present or added in the reaction medium (except for the small amounts used as the carrier for the catalyst system or other additives, or amounts found with the monomer; e.g., propane in propylene).

In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In a typical polymerization, the run time of the reaction is up to 300 minutes, preferably in the range of from about 5 to 250 minutes, or preferably from about 10 to 120 minutes.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is an alkane having from 3 to 7 carbon atoms, such as a branched alkane. The medium employed should be liquid under the conditions of polymerization and relatively inert. When a propane medium is used, the process must be operated above the reaction diluent critical temperature and pressure. For example, a hexane or an isobutane medium can be employed.

Polyolefin Products

The present disclosure further provides compositions of matter produced by the methods described herein.

As used herein, "high molecular weight" is defined as a weight average molecular weight (Mw) value of 150,000 g/mol or more. "Low molecular weight" is defined as an Mw value of less than 150,000 g/mol.

As used herein, "low comonomer content" is defined as a polyolefin having 6 wt % or less of comonomer based upon the total weight of the polyolefin. As used herein, "high comonomer content" is defined as a polyolefin having greater than 6 wt % of comonomer based upon the total weight of the polyolefin.

In at least one embodiment, a process described herein produces ethylene homopolymers or ethylene copolymers, such as ethylene-alpha-olefin (such as $C_3$ to $C_{20}$) copolymers (such as ethylene-butene copolymers, ethylene-hexene and/or ethylene-octene copolymers).

Likewise, the process of the present disclosure produces ethylene copolymers. In at least one embodiment, the copolymers produced herein have from 0 to 25 mol % (alternatively from 0.5 to 20 mol %, alternatively from 1 to 15 mol %, such as from 3 to 10 mol %) of one or more $C_3$ to $C_{20}$ olefin comonomer, such as a $C_3$-$C_{20}$ alpha-olefin, (such as $C_3$ to $C_{12}$ alpha-olefin, such as propylene, butene, hexene, octene, decene, dodecene, such as propylene, butene, hexene, octene).

In at least one embodiment, the monomer is ethylene and the comonomer is hexene, such as from 1 to 15 mol % hexene, alternatively 1 to 10 mol %.

In at least one embodiment, a method of the present disclosure provides an in-situ ethylene polymer composition having: 1) at least 50 mol % ethylene; and 2) a density of 0.91 g/cm³ or more, such as 0.95 g/cm³ or more (ASTM 1505). For example, the copolymer can have higher comonomer (e.g., hexene) content in the higher molecular weight (Mw) component of the resin as compared to the lower molecular weight (Mw) component, such as at least 10% higher, such as at least 20% higher, such as at least 30% higher as determined by GPC-4D. The dividing line between higher and lower Mw is the midpoint between the Mw's of two polymers each made using the same polymerization conditions as the product made using the two catalysts on a support, except that the first polymer is made without the catalyst represented by formula (I) and the second polymer is made without the catalyst represented by formula (II). In the event such a midpoint cannot be determined because one or both single catalysts will not produce polymer at the required conditions then an Mw of 150,000 g/mol shall be used.

In at least one embodiment, the present disclosure provides a polyethylene composition comprising: a MI from 0.1 to 6 g/10 min (alternately 0.5 to 5 g/10 min, alternately 0.75 to 4 g/10 min); a density from 0.890 g/cm³ to 0.950 g/cm³ (alternately 0.900 g/cm³ to 0.940 g/cm³, alternately 0.910 g/cm³ to 0.935 g/cm³, alternately 0.920 g/cm³ to 0.930 g/cm³); a HLMI from 5 to 40 g/10 min (alternately 10 to 35 g/ml, alternately 15 to 30 g/ml); and or a bulk density of from 0.2 g/cm³ to 0.5 g/cm³, such as 0.25 g/cm³ to 0.4 g/cm³, such as 0.28 g/cm³ to 0.35 g/cm³.

The copolymer produced herein has a composition distribution breadth $T_{75}$-$T_{25}$, as measured by TREF, that is greater than 20° C., such as greater than 30° C., such as greater than 40° C. The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

For instance, the polymers produced herein have an Mw of 5,000 to 1,000,000 g/mol (such as 25,000 g/mol to 500,000 g/mol, such as 150,000 g/mol to 250,000 g/mol, such as 150,000 g/mol to 200,000 g/mol), and/or an Mw/Mn of greater than 1 to 40 (alternatively 1.2 to 20, alternatively 1.3 to 10, alternatively 1.4 to 5, 1.5 to 4, alternatively 1.5 to 3) as determined by GPC-4D. Polymers produced herein have an Mz/Mw from about 1 to about 10, such as from about 2 to about 6, such as from about 3 to about 5. Polymers produced herein have an Mz/Mn from about 1 to about 10, such as from about 2 to about 6, such as from about 3 to about 5. Furthermore, the ratio of other average molecular weight ratios can also been calculated to highlight how the distribution is affected. For instance, a trace amount of very high MW species in a polymer product can raise Mz more than Mw and, therefore, result in a significantly higher ratio of Mz/Mw. Such difference in the effect on molecular weight distribution has been discovered to have profound effects on film toughness, such as tear property, through molecular orientation during the fabrication process.

In at least one embodiment, the polymer produced herein has a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa).

In at least one embodiment, the polymer produced herein has a bimodal molecular weight distribution as determined by Gel Permeation Chromatography (GPC). By "bimodal" is meant that the GPC trace has two peaks or at least 4 inflection points.

TREF Method

Temperature Rising Elution Fractionation (TREF) analysis is done using a Crystallization Elution Fractionation (CEF) instrument from Polymer Char, S.A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. In particular, a process conforming to the "TREF separation process" shown in FIG. 1a of this article, in which Fc=0, was used. Pertinent details of the analysis method and features of the apparatus used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-µm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 µm), which is back-flushed after every filtration. The filtrate was then used to completely fill a 200-µl injection-valve loop. The volume in the loop was then introduced near the center of the CEF column (15-cm long SS tubing, 3/8" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

Gel Permeation Chromatography—Tosoh EcoSEC High Temperature GPC System (GPC-Tosoh EcoSEC)

Mw, Mn and Mw/Mn were determined by using a High Temperature Gel Permeation Chromatography (Tosoh Bioscience LLC), equipped with a differential refractive index detector (DRI). Three high temperature TSK gel column (Tosoh GMHHR-H(30)HT2) were used. The nominal flow rate was 1.0 mL/min, and the nominal injection volume was 300 µL. The various transfer lines, columns, and dual flow differential refractometer (the DRI detector) were contained in an oven maintained at 160° C. Solvent for the experiment was prepared by dissolving 1.2 grams of butylated hydroxytoluene as an antioxidant in 4 liters of Aldrich reagent grade 1, 2, 4 trichlorobenzene (TCB). The TCB mixture was then filtered through a 0.1 µm Teflon filter. The TCB was then degassed with an online degasser before entering the GPC instrument. Polymer solutions were prepared by placing dry polymer in glass vials, adding the desired amount of TCB, then heating the mixture at 160° C. with continuous shaking for about 2 hours. All quantities were measured gravimetrically. The injection concentration was from 0.5 to 2.0 mg/mL, with lower concentrations being used for higher molecular weight samples. Flow rate in the apparatus was then increased to 1.0 mL/minute, and the DRI was allowed to stabilize for 2 hours before injecting the first sample. The molecular weight was determined by combining universal calibration relationship with the column calibration which was performed with a series of monodispersed polystyrene (PS) standards. The MW was calculated at each elution volume with the following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ are obtained from published literature. Specifically, a/K=0.695/0.000579 for polyethylene and 0.705/0.0002288 for polypropylene.

The concentration, c, at each point in the chromatogram was calculated from the baseline-subtracted DRI signal, $I_{DRI}$, using the following equation:

$$c = K_{DRI}I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery is calculated from the ratio of the integrated area of the concentration chromatography over elution volume and the injection mass which was equal to the pre-determined concentration multiplied by injection loop volume.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_{3/1000}TC$ as a function of molecular weight, is applied to obtain the bulk $CH_{3/1000}TC$. A bulk methyl chain ends per 1000TC (bulk $CH_3$end/1000TC) is obtained by weight-averaging the chain-end correction over the molecular-weight range. Then $$w2b = f*\text{bulk } CH3/1000TC$$

bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, s, for the solution flowing through the viscometer is calculated from their outputs. The intrinsic viscosity, $[\eta]$, at each point in the chromatogram is calculated from the equation $[\eta]\eta_S/c$, where c is concentration and is determined from the IR5 broadband channel output. The viscosity MW at each point is calculated as $M = K_{PS} M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{K M_v^{\alpha}},$$

where $M_v$ is the viscosity-average molecular weight based on molecular weights determined by LS analysis and the K and $\alpha$ are for the reference linear polymer, which are, for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $$x2 = -\frac{200 \, w2}{-100 n - 2 w2 + n w2}.$$

Then the molecular-weight distribution, W(z) where z=$\log_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz$$

and a modified weight-average molecular weight ($M_w'$) is calculated over the effectively reduced range of molecular weights as follows:

$$M_w' = \int_{-\infty}^{\infty} 10^z * W' dz.$$

The RCI,m is then computed as $$RCI, m = \int_{-\infty}^{\infty} x2 (10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100} (10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

An "in-situ polymer composition" (also referred to as an "in-situ blend" or a "reactor blend") is the composition which is the product of a polymerization with two catalyst compounds in the same reactor described herein. Without wishing to be bound by theory it is thought that the two catalyst compounds produce a reactor blend (i.e., an interpenetrating network) of two (or more) components made in the same reactors (or reactions zones) with the two catalysts. These sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In at least one embodiment, the polymer composition produced is an in-situ polymer composition.

In at least one embodiment, the polymer produced is an in-situ polymer composition having an ethylene content of 70 wt % or more, such as 80 wt % or more, such as 90 wt % or more and/or a density of 0.910 or more, alternatively 0.93 g/cm$^3$ or more, alternatively 0.935 g/cm$^3$ or more, alternatively 0.940 g/cm$^3$ or more, alternatively 0.948 g/cm$^3$ or more.

In at least one embodiment of the present disclosure, the polymer produced is an in-situ polymer composition having a density of 0.910 g/cm$^3$ or more, alternatively from 0.935 to 0.960 g/cm$^3$.

In at least one embodiment of the present disclosure, the polymer produced by the processes described herein comprises ethylene and one or more comonomers and the polymer has: 1) an RCI,m greater than 30 (alternatively greater than 30 to 50), an Mw/Mn of greater than 3, and optionally a $T_{75}$-$T_{25}$ of 15 to 20° C.; or 2) an RCI,m greater than 50 (alternatively greater than 80), an Mw/Mn of greater than 5 (alternatively from 5 to 10), and optionally a $T_{75}$-$T_{25}$ of from 25 to 75° C., such as from 45 to 75° C., such as from 25 to 45° C.

In at least one embodiment of the present disclosure, when:
1) the compound represented by formula (I) is run under the same polymerization conditions as a supported two catalyst composition described herein, except that the compound represented by formula (II) is absent, a polymer having an RCI,m of 20 or more is produced; and
2) the compound represented by formula (II) is run under the same polymerization conditions as step 1), except that the compound represented by formula (I) is absent, a polymer having an RCI,m of less than zero is produced.

In at least one embodiment, a linear low density polyethylene may be produced by using the catalyst systems described herein (e.g., having activator and two catalysts (I) and (II) supported on the same support) where the LLDPE has: a) an RCI,m greater than 30 (alternately greater than 30 to 50), an Mw/Mn of greater than 3 to less than 5, and optionally a $T_{75}$-$T_{25}$ of 15-20° C.; or b) an RCI,m greater than 50 (alternately greater than 80) and an Mw/Mn of greater than 5 (optionally of greater than 5 to 10), and optionally a $T_{75}$-$T_{25}$ of 25-45° C., provided that:
1) when the supported bridged hafnium metallocene catalyst compound (I) is run under the same polymerization conditions as the catalyst systems except that the unbridged hafnium metallocene catalyst compound (II) is absent, an ethylene polymer is produced having an RCI,m greater than 20; and
2) when the supported unbridged hafnium metallocene catalyst compound (II) is run under the same conditions as step 1) except that the bridged hafnium metallocene catalyst compound (I) is absent, an ethylene polymer is produced having a negative RCI,m.

To obtain polymers having higher RCI,m's (such as 50 and above) select bridged catalysts compounds represented by formula (I) that produce high comonomer content and or high Mw/Mn.

In at least one embodiment, a polymer of the present disclosure has a PDI of from 1 to about 6, such as from 1 to 5, such as from 1 to 4.

In at least one embodiment, a polymer of the present disclosure has a high degree of internal unsaturation. In at least one embodiment, a polymer has an internal unsaturation of 30% or greater of the total unsaturations, such as 35% or greater, such as 40% or greater, such as 45% or greater. Internal unsaturation can be promoted by increasing the amount of the catalyst represented by formula (I) (as compared the amount of the catalyst represented by formula (II)) in a catalyst system of the present disclosure. Polymers having a high degree of internal unsaturation can provide a low content of long chain branching, such as $g'_{vis}$ of 0.90, preferably 0.95 or more. Internal unsaturation can disrupt the crystallization of ethylene chains and contribute to the amorphous phase of the PE resin which may contribute to stronger mechanical properties in the film. In at least one embodiment, a polymer has 0.2 or greater internal unsaturations per 1,000 carbons, such as 0.3 or greater internal unsaturations per 1,000 carbons, such as 0.4 or greater internal unsaturations per 1,000 carbons, such as 0.45 or greater internal unsaturations per 1,000 carbons.

Polymers of the present disclosure can also have a low degree of terminal unsaturation, e.g., vinylogous end groups. In at least one embodiment, a polymer has a terminal unsaturation of 25% or less of the total unsaturations, such as 15% or less, such as 10% or less, alternately from 1 to 30%, from 1 to 15%, from 1 to 5%. Terminal unsaturation can be promoted by increasing the amount of the catalyst represented by formula (II) (as compared the amount of the catalyst represented by formula (I)) in a catalyst system of the present disclosure. Terminal unsaturation can provide reactive end groups of polymers for functionalization.

In at least one embodiment, a polymer of the present disclosure has a combination of internal and terminal unsaturation of greater than 0.7 unsaturations per 1,000 carbon atoms, such as greater than 0.8, such as greater than 0.9.

In at least one embodiment, a polymer of the present disclosure has a ratio of terminal unsaturation to internal unsaturation of 1:10 or greater, such as 1:15 or greater, such as 1:20 or greater.

Unsaturation (internal and terminal) in a polymer can be determined by $^1$H NMR with reference to *Macromolecules* 2014, 47, 3782 and *Macromolecules*, 2005, 38, 6988, but in event of conflict *Macromolecules*, 2014, 47, 3782 shall control. Peak assignments are determined referencing the solvent of tetrachloroethane-1,2 $d_2$ at 5.98 ppm. Specifically, percent internal unsaturation is determined by adding Vy1+ Vy2+trisubstituted olefins then dividing by total unsaturation.

In at least one embodiment, a polymer of the present disclosure has an MI of 0.6 or greater g/10 min, such as 0.7 or greater g/10 min, such as 0.8 or greater g/10 min, such as 0.9 or greater g/10 min.

In at least one embodiment, a polymer of the present disclosure has an HLMI of 15 or greater g/10 min, such as 20 or greater g/10 min, such as 27 or greater g/10 min.

In at least one embodiment, a polymer of the present disclosure has an MIR of 15 or greater g/10 min, such as 20 or greater g/10 min, such as greater than 25 or greater g/10 min.

In at least one embodiment, a polymer of the present disclosure has a RCI,m greater than 50, such as greater than 55, such as greater than 60, such as greater than 65.

In at least one embodiment, a polymer of the present disclosure has a density of from 0.900 g/cm$^3$ to 0.99 g/cm$^3$, such as from 0.900 g/cm$^3$ to 0.95 g/cm$^3$, such as from 0.900 g/cm$^3$ to 0.92 g/cm$^3$.

End Uses

The multi-modal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other suitable polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In at least one embodiment, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

This invention further relates to:

1. A catalyst system comprising: activator, support material, a hafnium metallocene catalyst represented by formula (I):

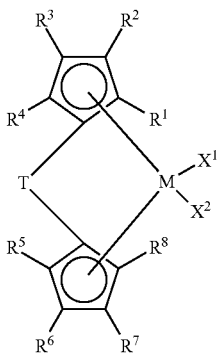

(I)

wherein: M is Hf;
each of $R^1$, $R^2$, $R^3$, $R^4$ $R^5$, $R^6$, $R^7$, and $R^8$ is independently hydrogen, alkoxide, $C_1$ to $C_{40}$ substituted or unsubstituted hydrocarbyl, or —$R^{13}$—SiR'$_3$ or —$R^{13}$—CR'$_3$ wherein $R^{13}$ is $C_1$ to $C_4$ hydrocarbyl, and each R' is independently hydrogen or $C_1$ to $C_{20}$ substituted or unsubstituted hydrocarbyl, or two or more of $R^1$, $R^2$, $R^3$, and $R^4$ form a substituted or unsubstituted, saturated, partially unsaturated or aromatic, cyclic or polycyclic substituent ring, or two or more of $R^5$, $R^6$, $R^7$, and $R^8$ form a substituted or unsubstituted, saturated, partially unsaturated or aromatic, cyclic or polycyclic substituent ring, wherein at least one of $R^1$, $R^2$, $R^3$, $R^4$, $R^5$, $R^6$, $R^7$, and $R^8$ is —$R^{13}$—SiR'$_3$ or —$R^{13}$—CR'$_3$ wherein $R^{13}$ is $C_1$ to $C_4$ hydrocarbyl, and each R' is independently hydrogen or $C_1$ to $C_{20}$ substituted or unsubstituted hydrocarbyl;
T is a bridging group; and
each of $X^1$ and $X^2$ is independently a univalent anionic ligand, a diene ligand, an alkylidene ligand, or $X^1$ and $X^2$ are joined to form a metallocyclic ring; and a hafnium metallocene catalyst represented by formula (II):

$(Ind)_s(Cp)_mM'X_q$  (II), wherein: M' is a Hf; Ind is an indenyl group substituted with 1 to 7 hydrocarbyl or substituted hydrocarbyl groups; Cp is a cyclopentadienyl group substituted with 4 or 5 hydrocarbyl or substituted hydrocarbyl groups; each X is, independently, a leaving group; s is 1 or 2; m is 0 or 1; s+m is 2; q is 0, 1, or 2; and s+m+q is 3 or 4.

2. The catalyst system of paragraph 1, wherein at least two of $R^1$, $R^2$, $R^3$, $R^4$, $R^5$, $R^6$, $R^7$, and $R^8$ are, independently —$R^{13}$—SiR'$_3$ or —$R^{13}$—CR'$_3$ wherein $R^{13}$ is $C_1$ to $C_4$ hydrocarbyl, and each R' is independently hydrogen or $C_1$ to $C_{20}$ substituted or unsubstituted hydrocarbyl.

3. The catalyst system of paragraph 1, wherein $R^2$ and $R^7$ are independently —$R^{13}$—SiR'$_3$ or —$R^{13}$—CR'$_3$ wherein $R^{13}$ is a $C_1$ to $C_4$ hydrocarbyl and each R' is independently hydrogen or a $C_1$ to $C_{20}$ substituted or unsubstituted hydrocarbyl.

4. The catalyst system of paragraph 1, wherein $R^2$ and $R^7$ are independently selected from —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, and —CH$_2$—Si(Cy)$_2$Ph.

5. The catalyst system of paragraph 4, wherein $R^2$ and $R^7$ are each —CH$_2$—SiMe$_3$.

6. The catalyst system of any of paragraphs 1-5, wherein T is selected from R*$_2$C, R*$_2$Si, R*$_2$CSiR*$_2$, R*$_2$SiSiR*$_2$, R*$_2$CSiR*$_2$CR*$_2$, R*$_2$SiCR*$_2$SiR*$_2$, wherein R* is independently hydrogen or a substituted or unsubstituted $C_1$-$C_{20}$ hydrocarbyl, or two or more adjacent R* are joined to form a substituted or unsubstituted, saturated, partially unsaturated or aromatic, cyclic or polycyclic substituent.

7. The catalyst system of paragraph 6, wherein T is selected from CH$_2$, CH$_2$CH$_2$, SiMe$_2$, SiPh$_2$, Si(Me)$_2$Si(Me)$_2$, SiMePh, Si(CH$_2$)$_3$, preferably T is R*$_2$SiSiR*$_2$, wherein each R* is unsubstituted $C_1$-$C_{20}$ hydrocarbyl.

8. The catalyst system of any of paragraphs 1-7, wherein the catalyst represented by formula (II) is represented by formula (IV):

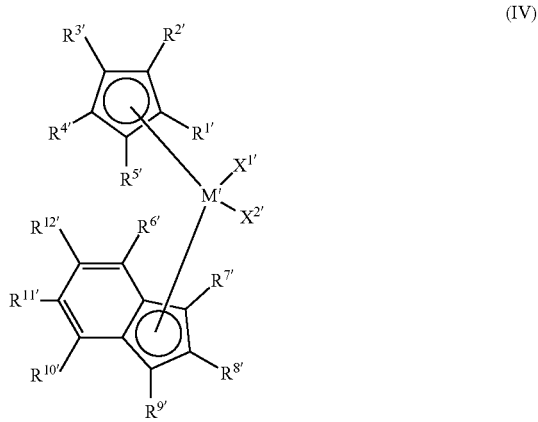

(IV)

wherein:
M' is Hf;
each of $X^{1'}$ and $X^{2'}$ is independently a univalent anionic ligand, a diene ligand, an alkylidene ligand, or $X^{1'}$ and $X^{2'}$ are joined to form a metallocyclic ring,
each of $R^{1'}$, $R^{2'}$, $R^{3'}$, $R^{4'}$, $R^{5'}$, $R^{6'}$, $R^{7'}$, $R^{8'}$, $R^{9'}$, $R^{10'}$, $R^{11'}$, and $R^{12'}$ is independently hydrogen, alkoxide, $C_1$ to $C_{40}$ substituted or unsubstituted hydrocarbyl, or —R"—SiR'$_3$ or —R"—CR'$_3$ where R" is $C_1$ to $C_4$ hydrocarbyl, and each R' is independently $C_1$ to $C_{20}$ substituted or unsubstituted hydrocarbyl; or at least one of $R^{1'}$ and $R^{2'}$, $R^{2'}$ and $R^{3'}$, $R^{3'}$ and $R^{4'}$, $R^{4'}$ and $R^{5'}$ $R^{5'}$ and $R^{1'}$ is combined to form:

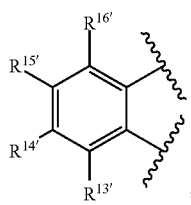

wherein each of $R^{13'}$, $R^{14'}$, $R^{15'}$, and $R^{16'}$ is independently hydrogen, alkoxide, $C_1$ to $C_{40}$ substituted or unsubstituted hydrocarbyl, or —R"—SiR'$_3$ or —R"—CR'$_3$ where R" is $C_1$ to $C_4$ hydrocarbyl, and each R' is independently $C_1$ to $C_{20}$ substituted or unsubstituted hydrocarbyl, wherein:
1) at least 1 of $R^{6'}$, $R^{7'}$, $R^{8'}$, $R^{9'}$, $R^{10'}$, $R^{11'}$, $R^{12'}$ is not H; and
2) at least 4 of $R^{1'}$, $R^{2'}$, $R^{3'}$, $R^{4'}$, and $R^{5'}$ are not hydrogen when two adjacent R groups, $R^{1'}$ and $R^{2'}$, $R^{2'}$ and $R^{3'}$, $R^{3'}$ and $R^{4'}$, $R^{4'}$ and $R^{5'}$, $R^{5'}$ and $R^{1'}$, are not combined to form a ring; and 3) when two adjacent R groups are combined to form:

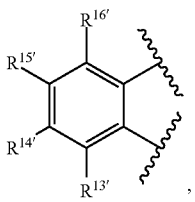

then at least one of the remaining R groups is not H.

9. The catalyst system of paragraph 8, wherein each of $R^1$, $R^{2'}$, $R^{3'}$, $R^{4'}$, and $R^{5'}$ is $C_1$ to $C_{20}$ alkyl and $R^{9'}$ is $C_1$ to $C_{20}$ alkyl, preferably each of $R^{1'}$, $R^{2'}$, $R^{3'}$, $R^{4'}$, and $R^{5'}$ is methyl and $R^{9'}$ is methyl.

10. The catalyst system of paragraph 8, wherein $R^{3'}$ and $R^{4'}$ are combined to form

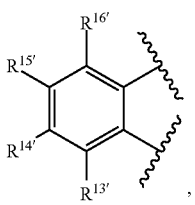

wherein each of $R^{2'}$, $R^{13'}$, $R^{14'}$, $R^{15'}$, and $R^{16'}$ is independently hydrogen, alkoxide, or $C_1$ to $C_{40}$ substituted or unsubstituted hydrocarbyl, and each of $R^{6'}$, $R^{7'}$, $R^{8'}$, $R^{9'}$, $R^{10'}$, $R^{11'}$, and $R^{12'}$ is independently hydrogen, alkoxide, or $C_1$ to $C_{40}$ substituted or unsubstituted hydrocarbyl.

11. The catalyst system of paragraph 10, wherein each of $R^{2'}$, $R^{14'}$ and $R^{15'}$ is independently $C_1$ to $C_{40}$ substituted or unsubstituted hydrocarbyl, each of $R^{1'}$, $R^{5'}$, $R^{13'}$ and $R^{16'}$ is hydrogen, each of $R^{7'}$, $R^{11'}$, and $R^{12'}$ is independently $C_1$ to $C_{40}$ substituted or unsubstituted hydrocarbyl; and each of $R^{6'}$, $R^{8'}$, $R^{9'}$, and $R^{10'}$ is hydrogen.

12. The catalyst system of paragraph 11, wherein each of $R^{2'}$, $R^{7'}$, $R^{11'}$, $R^{12'}$, $R^{14'}$, $R^{15'}$ is methyl.

13. The catalyst system of paragraph 1, wherein the catalyst represented by formula (I) is selected from: rac/meso-Me$_4$Si$_2$(3-Me$_3$Si—CH$_2$-Cp)$_2$HfMe$_2$; rac-Me$_4$Si$_2$(3-Me$_3$Si—CH$_2$-Cp)$_2$HfMe$_2$; meso-Me$_4$Si$_2$(3-Me$_3$Si—CH$_2$-Cp)$_2$HfMe$_2$; rac/meso-Me$_2$Si(3-Me$_3$Si—CH$_2$-Cp)$_2$HfMe$_2$; rac-Me$_2$Si(3-Me$_3$Si—CH$_2$-Cp)$_2$HfMe$_2$; Me$_4$Si$_2$(Me$_4$Cp)(3-Me$_3$Si—CH$_2$-Cp)HfMe$_2$; Me$_2$Si(Me$_4$Cp)(3-Me$_3$Si—CH$_2$-Cp)HfMe$_2$; SiMe$_2$(EtMe$_3$Cp)(3-CH$_2$—SiMe$_3$-Cp)HfMe$_2$; SiMe$_2$(Me$_4$Cp)(3-CH$_2$—SiPhMe$_2$-Cp)HfMe$_2$; Si$_2$Me$_4$(Me$_4$Cp)(3-CH$_2$—SiPhMe$_2$-Cp)HfMe$_2$; SiMe$_2$(EtMe$_3$Cp)(3-CH$_2$—SiPh$_3$-Cp)HfMe$_2$; Si$_2$Me$_4$(EtMe$_3$Cp)(3-CH$_2$—SiPh$_3$-Cp)HfMe$_2$; SiMe$_2$(Me$_4$Cp)(3-CH$_2$—SiPh$_3$-Cp) HfMe$_2$; SiMe$_2$(EtMe$_3$Cp)(3-CH$_2$—SiPh$_3$-Cp)HfMe$_2$; SiMe$_2$(2-Me,3-CH$_2$—SiMe$_3$-Ind)$_2$HfMe$_2$; Si$_2$Me$_4$(2-Me,3-CH$_2$—SiMe$_3$-Ind)$_2$HfMe$_2$; SiMe$_2$(2-Me,3-CH$_2$—SiPhMe$_2$-Ind)$_2$HfMe$_2$; Si$_2$Me$_4$(2-Me,3-CH$_2$—SiPhMe$_2$-Ind)$_2$HfMe$_2$; SiMe$_2$(2-Me,3-CH$_2$—SiPh$_3$-Ind)$_2$HfMe$_2$; and Si$_2$Me$_4$(2-Me,3-CH$_2$—SiPh$_3$-Ind)$_2$HfMe$_2$.

14. The catalyst system of paragraph 1, wherein the catalyst represented by formula (II) is selected from rac/meso-bis(1-methylindenyl)hafnium dichloride; rac/meso-bis(1-ethylindenyl)hafnium dichloride; rac/meso-bis(1-methylindenyl) hafnium dimethyl; rac/meso-bis(1-ethylindenyl)hafnium dimethyl; rac/meso-bis(1-propylindenyl)hafnium dichloride; rac/meso-bis(1-propylindenyl)hafnium dimethyl; rac/meso-bis(1-butylindenyl)hafnium dichloride; rac/meso-bis(1-butylindenyl)hafnium dimethyl; (1-methylindenyl)(pentamethyl cyclopentadienyl) hafnium dimethyl; (1-methylindenyl)(pentamethyl cyclopentadienyl) hafnium dichloride; (1-methylindenyl)(tetramethyl cyclopentadienyl) hafnium dimethyl; (1-methylindenyl)(tetramethyl cyclopentadienyl) hafnium dichloride; bis(1,5,6-trimethylindenyl)hafnium dichloride; and bis(1,5,6-trimethylindenyl) hafnium dimethyl.

15. The catalyst system of paragraphs 1 to 14, wherein the activator is an alkylalumoxane.

16. The catalyst system of paragraphs 1 to 15, wherein the support material is selected from Al$_2$O$_3$, ZrO$_2$, SiO$_2$, and SiO$_2$/Al$_2$O$_3$, preferably the support material is silica.

17. A process for polymerization of olefin monomers comprising contacting one or more monomers with a catalyst system of any of paragraphs 1 to 16; and obtaining a polyolefin.

18. The process of paragraph 17, wherein contacting comprises contacting in a single reaction zone, in the gas phase or slurry phase, ethylene and $C_3$ to $C_{20}$ comonomer with the catalyst system; and obtaining a polyolefin comprises obtaining an ethylene polymer having an Mw value of 150,000 g/mol or greater and an internal unsaturation content of 0.2 or greater internal unsaturations per 1,000 carbons.

19. The process of paragraph 18, wherein the polyolefin has an internal unsaturation content of 0.4 or greater internal unsaturations per 1,000 carbons.

20. The process of paragraphs 18 or 19, wherein the polyolefin has a melt index ratio of 15 or greater g/10 min.

21. The process of any of paragraphs 18 to 20, wherein the polyolefin has a melt index ratio of 25 or greater g/10 min.

22. The process of any of paragraphs 18 to 21, wherein the poly olefin has a density of from 0.900 g/cm$^3$ to 0.95 g/cm$^3$.

23. An ethylene copolymer having an Mw value of 150,000 g/mol or greater and an internal unsaturation content of 0.4 or greater internal unsaturations per 1,000 carbons.

24. The ethylene copolymer of paragraph 23, wherein the ethylene copolymer has a melt index ratio of 15 or greater g/10 min.

25. The ethylene copolymer of paragraphs 23 or 24, wherein the ethylene copolymer has a melt index ratio of 25 or greater g/10 min.

26. The ethylene copolymer of any of paragraphs 23 to 25, wherein the ethylene copolymer has a density of from 0.900 g/cm$^3$ to 0.95 g/cm$^3$.

27. A catalyst compound represented by formula (IV):

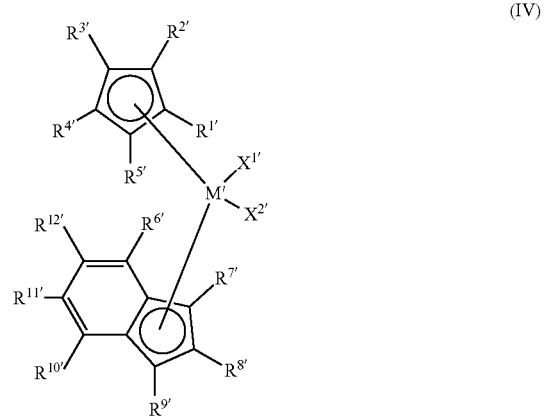

(IV)

wherein:

M' is Hf;

each of $X^1$ and $X^{2'}$ is independently a univalent anionic ligand, a diene ligand, an alkylidene ligand, or $X^{1'}$ and $X^{2'}$ are joined to form a metallocyclic ring; and $R^{3'}$ and $R^{4'}$ are combined to form

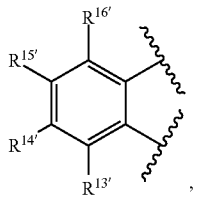

wherein each of $R^{2'}$, $R^{14'}$, $R^{15'}$, is independently alkoxide or $C_1$ to $C_{40}$ substituted or unsubstituted hydrocarbyl, and each of $R^{6'}$, $R^{7'}$, $R^{8'}$, $R^{9'}$, $R^{10'}$, $R^{11'}$, $R^{12'}$, $R^{13'}$, and $R^{16'}$ is independently hydrogen, alkoxide, or $C_1$ to $C_{40}$ substituted or unsubstituted hydrocarbyl.

28. The catalyst compound of paragraph 27, wherein each of $R^{1'}$, $R^{5'}$, $R^{6'}$, $R^{7'}$, $R^{8'}$, $R^{9'}$, $R^{10'}$, $R^{13'}$ and $R^{16'}$ is hydrogen.

29. The catalyst compound of paragraphs 27 or 28, wherein each of $R^{2'}$, $R^{7'}$, $R^{11'}$, $R^{12'}$, $R^{14'}$ and $R^{15'}$ is independently $C_1$ to $C_{40}$ substituted or unsubstituted hydrocarbyl, preferably $C_1$ to $C_{10}$ unsubstituted hydrocarbyl.

30. The catalyst compound of paragraphs 27 to 29, wherein the catalyst compound is bis(1,5,6-trimethylindenyl)hafnium dihalide or bis(1,5,6-trimethylindenyl)hafnium dialkyl.

Experimental Test Methods

¹H NMR

¹H NMR data was collected at 120° C. using a 10 mm CryoProbe with a Bruker spectrometer at a ¹H frequency of 400 MHz (available from Bruker Corporation, United Kingdom). Data were recorded using a maximum pulse width of 45°, 5 seconds between pulses and signal averaging 512 transients. Samples were prepared by dissolving 80 mg of sample in 3 mL of solvent heated at 140° C. Peak assignments are determined referencing the solvent of tetrachloroethane-1,2 $d_2$ at 5.98 ppm.

Cross-Fractionation Chromatography (CFC)

Cross-fractionation chromatography (CFC) analysis was done using a CFC-2 instrument from Polymer Char, S.A., Valencia, Spain. The principles of CFC analysis and a general description of the particular apparatus used are given in the article by Ortin, A.; Monrabal, B.; Sancho-Tello, 257 J. Macromol. Symp. 13 (2007). Details of the analysis method and features of the apparatus used are as follows.

The solvent used for preparing the sample solution and for elution was 1,2-Dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., 3/8"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3×PLgel 10 m Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. Size Exclusion Chromatography; Springer, 1999. For polystyrene $K=1.38\times10^{-4}$ dl/g and $\alpha=0.7$; and for polyethylene $K=5.05\times10^{-4}$ dl/g and $\alpha=0.693$ were used. For a polymer fraction, which eluted at a temperature step, that has a weight fraction (wt % recovery) of less than 0.5%, the MWD and the molecular-weight averages were not computed; additionally, such polymer fractions were not included in computing the MWD and the molecular-weight averages of aggregates of fractions.

Melt index ratio (MIR) is High Load Melt Index (HLMI) divided by Melt index (MI) as determined by ASTM D1238. Melt index (MI), also referred to as I2, reported in g/10 min, is determined according to ASTM D1238, 190° C., 2.16 kg load. High load melt index (HLMI), also referred to as I21, reported in g/10 min is determined according to ASTM D1238, 190° C., 21.6 kg load.

Catalyst Compounds

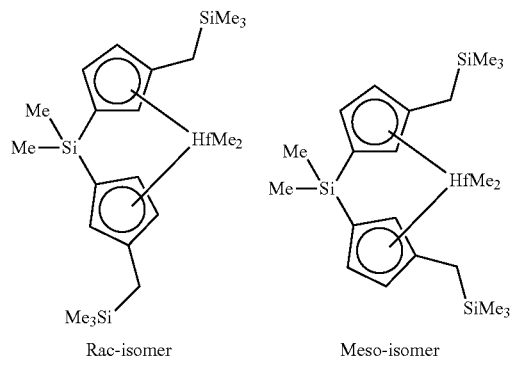

Complex/Catalyst 1

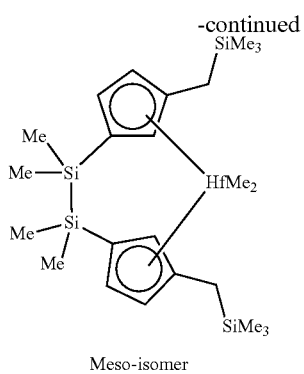

Meso-isomer

Complex/Catalyst 2

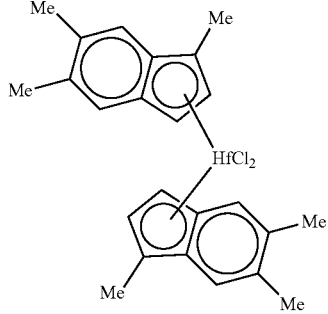

Complex/Catalyst 3

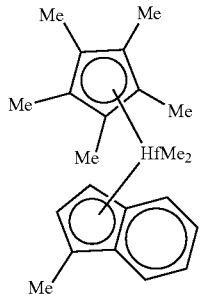

Complex/Catalyst 4

Syntheses

All manipulations were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dimethylsilyl dichloride ($Me_2SiCl_2$), diphenylsilyl dichloride ($Ph_2SiCl_2$) methylmagnesium bromide (3.0 M solution in diethyl ether) and silver trifluoromethanesulfonate (AgOTf) were purchased from Sigma-Aldrich. Hafnium tetrachloride ($HfCl_4$) 99+% and (trimethylsilyl)methyl trifluoromethanesulfonate were procured from Strem Chemicals and TCI America, respectively, and used as received. Potassium cyclopentadienide (KCp) was prepared according to the procedure described in Stadelhofer, J.; Weidlein, J.; Haaland, A. *J. Organomet. Chem.* 1975, 84, $C_1$-$C_4$. The $^1$H NMR measurements were obtained as described above.

Synthesis of Trimethylsilylmethylcyclopentadiene, $Me_3SiCH_2CpH$

Neat (trimethylsilyl)methyl trifluoromethanesulfonate (25.0 g, 105.8 mmol) was dissolved in 300 mL of diethyl ether and cooled to −25° C., to this a solid potassium cyclopentadienide (11.14 g, 106.9 mmol) was slowly added over a period of 10-15 minutes. The resulting mixture was stirred overnight at room temperature. Volatiles from the reaction mixture were carefully removed under controlled low vacuum or blowdown the volatiles with nitrogen gas to avoid evaporating the volatile trimethylsilylmethylcyclopentadiene, $Me_3SiCH_2CpH$. The reaction flask (250 mL round bottom flask) and frit with celite were weighted to calculate yield of the product after extraction. The crude materials were extracted into pentane (3×50 mL) and used without any further purification. Based on above mathematical method, the yield is calculated as 15.47 g (95.2%). The $^1$H NMR spectrum was recorded for the crude material to ensure the product formation. $^1$H NMR (400 MHz, $C_6D_6$): δ −0.05 ppm (9H, s, Si—$CH_3$), 1.77 ppm (2H, d, $J_{HH}$=1.2 Hz, $Me_3Si$—$CH_2$), 2.83 ppm (1H, sex, $J_{HH}$=1.5 Hz, Cp-CH), 5.80-6.49 ppm (4H, m, Cp-CH).

Synthesis of Lithium trimethylsilylmethylcyclopentadienide, $Me_3SiCH_2CpLi$

A hexane solution of n-butyllithium (41.5 mL, 103.8 mmol, 2.5 M solution in diethyl ether) was added drop-wise to a precooled solution (pentane and diethyl ether, 100/100 mL) of $Me_3SiCH_2CpH$ (15.47 g, 101.7 mmol) over a period of 40-50 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of $Me_3SiCH_2CpLi$ in 13.6 g (84.6%) yield. $^1$H NMR (400 MHz, THF-$d_8$): δ −0.09 ppm (9H, s, Si—$CH_3$), 1.84 ppm (2H, s, $Me_3Si$—$CH_2$), 5.36 ppm (2H, t, $J_{HH}$=2.6 Hz, Cp-H), 5.47 ppm (2H, t, $J_{HH}$=2.6 Hz, Cp-CH).

Synthesis of Tetramethyldisilyl-Bis(Trimethylsilyl-methylcyclopentadiene), $Me_4Si_2(Me_3SiCH_2CpH)_2$

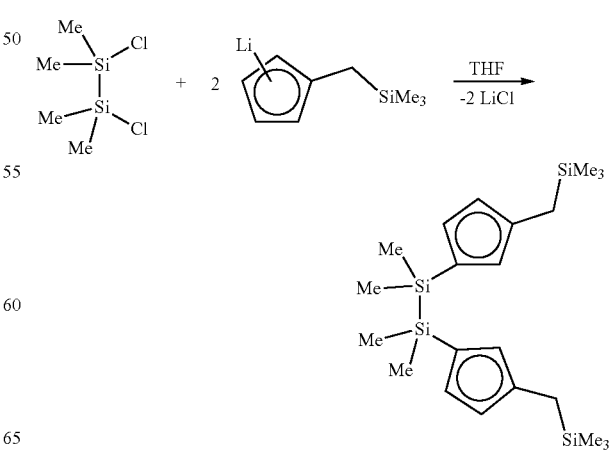

Neat Me$_4$Si$_2$Cl$_2$ (2.0 g, 10.8 mmol) was dissolved in 100 mL of THF and cooled to −25° C. A solid Me$_3$SiCH$_2$CpLi (3.44 g, 21.7) was added to the above mixture and the resulting mixture was stirred overnight at room temperature to ensure completion of the reaction. Volatiles from the reaction mixture were removed in vacuo and subsequently triturated with hexane to remove trace of THF. The crude materials were extracted into hexane and followed by solvent removal under vacuum afforded a thick yellow viscous oil of Me$_4$Si$_2$(Me$_3$SiCH$_2$CpH)$_2$ in 4.3 g (96.1%) yield. $^1$H NMR (400 MHz, C$_6$D$_6$-d$_8$): δ −0.13 to 0.17 ppm (30H, overlapped singlets, SiMe$_3$ and Me$_4$Si$_2$—CH$_3$), 1.76-1.89 ppm (4H, m, Me$_3$Si—CH$_2$), 2.83-3.24 ppm (2H, bs, Cp-CH), 5.86-6.60 ppm (6H, m, Cp-CH).

Synthesis of Lithium Tetramethyldisilyl-Bis(Trimethylsilylmethylcyclopentadienide), Me$_4$Si$_2$(Me$_3$SiCH$_2$Cp)$_2$Li$_2$

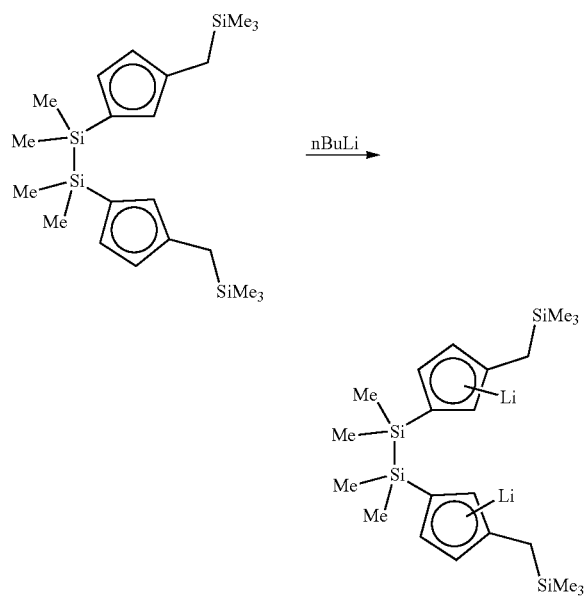

A hexane solution of n-butyllithium (9.4 mL, 23.4 mmol, 2.5 M solution) was added dropwise to a precooled solution of Me$_4$Si$_2$(Me$_3$SiCH$_2$CpH)$_2$ (4.85 g, 11.6 mmol) in 100 mL of THF over a period of 25-30 minutes. The resulting mixture was gradually warmed to room temperature and then continuously stirred 2 hours at room temperature. Volatiles from the reaction mixture were removed in vacuo, and triturated with hexane. The crude materials were thoroughly washed with hexane to remove any soluble impurities, and dried under vacuum to obtain the colorless crystalline solid of Me$_4$Si$_2$(Me$_3$SiCH$_2$Cp)$_2$Li$_2$ in 4.4 g (99.5%) yield. $^1$H NMR (400 MHz, THF-d$_8$): δ −0.07 ppm (18H, s, SiMe$_3$-CH$_3$), 0.18 ppm (12H, s, SiMe$_2$-CH$_3$), 1.72 ppm (4H, s, Me$_3$Si—CH$_2$), 5.25 ppm (2H, s, Cp-CH), 5.32 ppm (2H, s, Cp-CH), 5.35 ppm (2H, s, Cp-CH).

Synthesis of Meso-tetramethylsilyl-bis(trimethylsilylmethylcyclopentadienyl)hafnium dichloride, meso-Me$_4$Si$_2$(Me$_3$SiCH$_2$Cp)$_2$HfCl$_2$

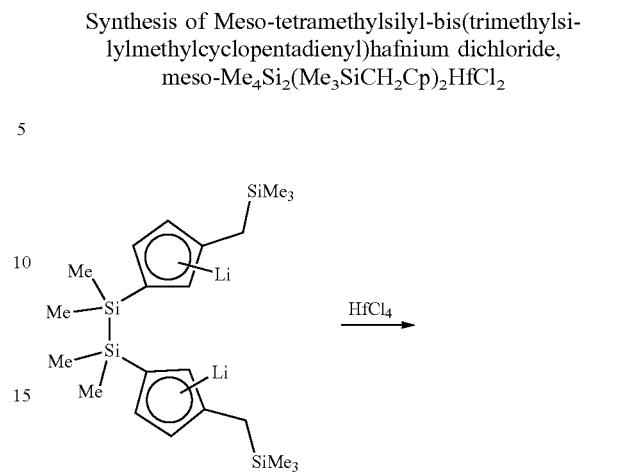

A solid HfCl$_4$ (3.50 g, 10.9 mmol) was added to a precooled diethyl ether (100 mL) solution of Me$_4$Si$_2$(Me$_3$SiCH$_2$Cp)Li$_2$ (4.7 g, 10.9 mmol) at −25° C. The resulting mixture was stirred overnight at room temperature. Insoluble materials were filtered out and volatiles from the filtrate were removed in vacuo. The crude materials were washed with cold hexane to remove soluble impurities. The resulting materials were dried under vacuum to obtain the pale yellow crystalline solid of meso-Me$_4$Si$_2$(Me$_3$SiCH$_2$Cp)$_2$HfCl$_2$ in 6.4 g (96.2%) yield. $^1$H NMR (400 MHz, CD$_2$Cl$_2$): δ −0.07 ppm (18H, s, SiMe$_3$-CH$_3$), 0.25 ppm (6H, s, SiMe$_2$-CH$_3$), 0.31 ppm (6H, s, SiMe$_2$-CH$_3$), 2.29 ppm (2H, d, Me$_3$Si—CH$_2$), 2.66 ppm (2H, d, Me$_3$Si—CH$_2$), 6.08 ppm (2H, m, Cp-CH), 6.16 ppm (2H, s, Cp-CH), 6.24 ppm (2H, s, Cp-CH).

Synthesis of Meso-tetramethylsilyl-bis(trimethylsilylmethylcyclopentadienyl)hafnium dimethyl, meso-Me$_4$Si$_2$(Me$_3$SiCH$_2$Cp)$_2$HfMe$_2$

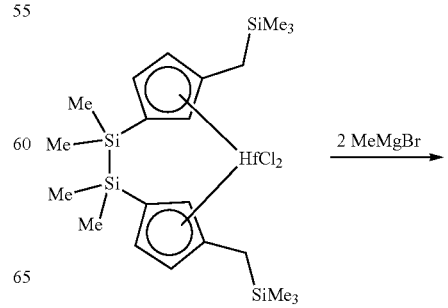

-continued

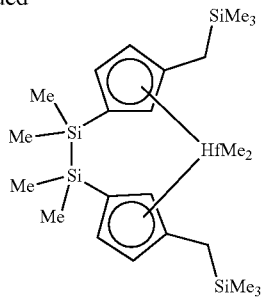

An ethereal solution of MeMgBr (6.8 mL, 20.3 mmol) was added dropwise to a precooled diethyl ether solution of meso-Me$_4$Si$_2$(Me$_3$SiCH$_2$Cp)$_2$HfCl$_2$ (6.7 g, 10.1 mmol) over a period of 5-10 minutes at −25° C. The resulting mixture was stirred overnight at room temperature to ensure completion of the reaction. All volatiles were removed in vacuo and triturated with hexane (3×20 mL), and then subsequently the crude materials were extracted into hexane. Solvent removal in vacuo and recrystallization in hexane at −25° C., afforded the colorless crystalline solid of meso-Me$_4$Si$_2$(Me$_3$SiCH$_2$Cp)$_2$HfMe$_2$ in 4.8 g (79.9%) yield. $^1$H NMR (400 MHz, C$_6$D$_6$): δ −0.20 ppm (3H, s, Hf—CH$_3$), −0.15 ppm (3H, s, Hf—CH$_3$), 0.04 ppm (18H, s, SiMe$_3$-CH$_3$), 0.21 ppm (6H, s, SiMe$_2$-CH$_3$), 0.25 ppm (6H, s, SiMe$_2$-CH$_3$), 2.08 ppm (2H, d, Me$_3$Si—CH$_2$), 2.28 ppm (2H, d, Me$_3$Si—CH$_2$), 5.77 ppm (2H, m, Cp-CH), 5.86 ppm (2H, m, Cp-CH), 6.00 ppm (2H, m, Cp-CH).

Synthesis of Dimethylsilyl-bis(trimethylsilylmethylcyclopentadiene), Me$_2$Si(Me$_3$SiCH$_2$CpH)$_2$ Neat Me$_2$SiCl$_2$ (2.5 g, 19.4 mmol) was dissolved in 100 mL of THF and cooled to −25° C. A solid lithium trimethylsilylmethylcyclopendienide (6.13 g, 38.8 mmol) was added to the above mixture and the resulting mixture was stirred overnight at room temperature to ensure completion of the reaction. Volatiles from the reaction mixture were removed in vacuo and subsequently triturated with pentane to remove trace of THF. The crude materials were extracted into pentane and followed by solvent removal under vacuum afforded a thick yellow viscous oil of Me$_2$Si(Me$_3$SiCH$_2$CpH)$_2$ in 7.0 g (100%) yield. $^1$H NMR (400 MHz, C$_6$D$_6$): δ −0.15 ppm (6H, bs, SiMe$_2$-CH$_3$), 0.05 ppm (18H, s, SiMe$_3$-CH$_3$), 1.81-1.87 ppm (4H, m, Me$_3$Si—CH$_2$), 3.26 ppm (1H, s, Cp-H), 3.37 ppm (1H, s, Cp-H), 5.99-6.82 ppm (6H, m, Cp-H).

Synthesis of Lithium Dimethylsilyl-Bis(Trimethylsilylmethylcyclopentadienide), Me$_2$Si(Me$_3$SiCH$_2$Cp)$_2$Li$_2$ A hexane solution of n-butyl lithium (15.7 mL, 39.2 mmol, 2.5 M solution) was added drop wise to a precooled solution of Me$_2$Si(Me$_3$SiCH$_2$CpH)$_2$ (7.0 g, 19.4 mmol) in 100 mL of THF over a period of 25-30 minutes at −25° C. The resulting mixture was gradually warmed to room temperature and then continuously stirred overnight. Volatiles from the reaction mixture were removed in vacuo, and triturated with pentane. The crude materials were thoroughly washed with pentane to remove any soluble impurities, and dried under vacuum to obtain the colorless crystalline solid of Me$_2$Si(Me$_3$SiCH$_2$Cp)$_2$Li$_2$ in 7.3 g (92%) yield. $^1$H NMR (400 MHz, THF-d$_8$): δ −0.09 ppm (18H, s, SiMe$_3$-CH$_3$), 0.18 ppm (6H, s, SiMe$_2$-CH$_3$), 1.85 ppm (4H, s, Me$_3$Si—CH$_2$), 5.50 ppm (2H, dd, J$_{HH}$=2.2 Hz, Cp-CH), 5.65 ppm (2H, t, J$_{HH}$=2.1 Hz, Cp-CH), 5.76 ppm (2H, dd, J$_{HH}$=2.2 Hz, Cp-CH).

Synthesis of Rac-meso-dimethylsilyl-bis(trimethylsilylmethylcyclopentadienide)hafnium dichloride, Me$_2$Si((Me$_3$Si)CH$_2$Cp)$_2$HfCl$_2$ A solid HfCl$_4$ (5.686 g, 17.8 mmol) was added to a precooled diethyl ether (120 mL) solution of Me$_2$Si(Me$_3$SiCH$_2$Cp)$_2$Li$_2$ (7.30 g, 17.8 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the yellow crystalline solid of Me$_2$Si(Me$_3$SiCH$_2$Cp)$_2$HfCl$_2$ in 10.5 g (97%) yield. The $^1$H NMR spectrum of purified compound integrated a ~1:1 ratio of rac/meso isomers. $^1$H NMR (400 MHz, CD$_2$Cl$_2$): δ −0.05 ppm (18H, s, SiMe$_3$-CH$_3$), −0.04 ppm (18H, s, SiMe$_3$-CH$_3$), −0.64 ppm (3H, s, SiMe$_2$-CH$_3$, meso), −0.65 ppm (6H, s, SiMe$_2$-CH$_3$, rac), −0.68 ppm (3H, s, SiMe$_2$-CH$_3$, meso), 2.08-2.18 ppm (8H, m, Me$_3$Si—CH$_2$), 5.14 ppm (2H, t, J$_{HH}$=2.6 Hz, Cp-CH), 5.28 ppm (2H, t, J$_{HH}$=2.6 Hz, Cp-CH), 5.64 ppm (2H, t, J$_{HH}$=2.7 Hz, Cp-CH), 5.77 ppm (2H, t, J$_{HH}$=2.7 Hz, Cp-CH), 6.19 ppm (2H, t, J$_{HH}$=2.7 Hz, Cp-CH), 6.34 ppm (2H, t, J$_{HH}$2.7 Hz, Cp-CH).

Synthesis of Rac-meso-dimethylsilyl-bis((trimethylsilyl) methylcyclopentadienide)hafnium dimethyl, Me$_2$Si((Me$_3$Si)CH$_2$Cp)$_2$HfMe$_2$ An ethereal solution of MeMgBr (11.6 mL, 34.6 mmol) was added dropwise to a precooled diethyl ether solution of Me$_2$Si(Me$_3$SiCH$_2$Cp)$_2$HfCl$_2$ (10.5 g, 17.3 mmol) over a period of 10-15 minutes at −25° C. The resulting mixture was stirred overnight at room temperature to ensure completion of the reaction. Insoluble materials were filtered through a pad of celite. Volatiles from the filtrate were removed under vacuum, and then the crude materials were extracted into pentane. Solvent removal in vacuo afforded a sticky yellow material of Me$_2$Si(Me$_3$SiCH$_2$-Cp)$_2$HfMe$_2$ in 8.3 g (84.6%) yield. The $^1$H NMR spectrum of final material integrated a ~1:1 ratio of rac/meso isomers. $^1$H NMR (400 MHz, C$_6$D$_6$): δ −0.25 ppm (3H, s, Hf—CH$_3$, meso), −0.24 ppm (6H, s, Hf—CH$_3$, rac), −0.20 ppm (3H, s, Hf—CH$_3$, meso), 0.03 ppm (18H, s, SiMe$_3$-CH$_3$, meso), 0.04 ppm (18H, s, SiMe$_3$-CH$_3$, rac), 0.19 ppm (3H, s, SiMe$_2$-CH$_3$, meso), 0.20 ppm (6H, s, SiMe$_2$-CH$_3$, rac), 0.22 ppm (3H, s, SiMe$_2$-CH$_3$, meso), 2.06 ppm (4H, s, Me$_3$Si—CH$_2$, rac), 2.09 ppm (4H, d, J$_{HH}$=3.1 Hz, Me$_3$Si—CH$_2$, meso), 5.03 ppm (2H, t, J$_{HH}$=2.2 Hz, Cp-CH, meso), 5.10 ppm (2H, t, J$_{HH}$=2.2 Hz, Cp-CH, rac), 5.34 ppm (2H, t, J$_{HH}$=2.6 Hz, Cp-CH, rac), 5.44 ppm (2H, t, J$_{HH}$=2.6 Hz, Cp-CH, meso), 6.26 ppm (2H, t, J$_{HH}$=2.6 Hz, Cp-CH, meso), 6.31 ppm (2H, t, J$_{HH}$=2.6 Hz, Cp-CH, rac).

Synthesis of rac/meso bis(1,5,6-Trimethylindenyl)hafnium dichloride

To a white suspension of lithium (1,5,6-trimethylindenide) (1.41 g, 8.59 mmol, 2.00 eq.) in ether (55 mL) at −35° C. was added hafnium tetrachloride bis(etherate) (2.00 g, 4.27 mmol, 1.00 eq.) to give a cloudy manila mixture. The mixture was allowed to warm to room temperature and stirred 18 hours. The thick, light yellow mixture was then evaporated under vacuum, leaving light yellow solid. The solid was extracted with dichloromethane (60 mL, then 3×5 mL) and the extracts filtered to give a yellow solution and white solid. The solution was evaporated under vacuum, leaving light yellow solid. The solid was washed with pentane (25 mL) and dried under vacuum. Yield 2.19 g (91%) light yellow powder. $^1$H NMR (400 MHz, $CD_2Cl_2$) δ 7.33 ppm (s, 2H), 7.26 ppm (s, 4H), 7.20 ppm (s, 2H), 6.12 ppm (dd, 2H), 5.91 ppm (dd, 2H), 5.61 ppm (dd, 2H), 5.44 ppm (dd, 2H), 2.42 ppm (d, 6H), 2.40 ppm (d, 6H), 2.38 ppm (m, 12H), 2.30 ppm (d, 6H), 2.32 (d, 6H). Ratio of rac/meso isomers of 0.43:0.57.

Synthesis of (1-methylindenyl)(pentamethylcyclopentadienyl)hafnium dichloride

To a light orange-brown suspension of (pentamethylcyclopentadienyl)hafnium trichloride (1,2-dimethoxyethane) (2.51 g, 4.92 mmol, 1.00 eq.) in ether (30 mL) was added lithium (1-methylindenide) (0.67 g, 4.92 mmol, 1.00 eq.) to give a light yellow-white mixture. The mixture was stirred 16 hours, then evaporated under vacuum to leave light yellow solid. The solid was extracted with dichloromethane (25 mL, then 3×5 mL) and the extracts filtered to give a yellow solution and white solid. The solution was evaporated under vacuum, leaving light yellow solid. The solid was washed with pentane (10 mL) and dried under vacuum. Yield 2.29 g (91%) light yellow powder. $^1$H NMR (400 MHz, $CD_2Cl_2$) δ 7.55 ppm (m, 1H), 7.31 ppm (m, 1H), 7.20 ppm (m, 2H), 6.02 ppm (d, 1H), 5.81 ppm (dd, 1H), 2.38 ppm (s, 3H), 2.07 ppm (s, 15H).

Synthesis of (1-methylindenyl)(pentamethylcyclopentadienyl)hafnium dimethyl (1-methylindenyl)(pentamethylcyclopentadienyl)hafnium dichloride (1.0 g, 1.94 mmol) in ether was cooled to −25° C., and to this a hexane solution of methyllithium (4.8 mL, 2.02 mmol, 1.6 M solution in diethyl ether) was added over a period of 5 minutes. The resulting mixture was continuously stirred overnight at room temperature. Volatiles were removed in vacuo. The crude materials were then extracted with hexane (30 mL×2), and subsequent solvent removal afforded (1-methylindenyl)(pentamethylcyclopentadienyl) hafnium dimethyl (0.70 g, 76% yield) as an off-white solid. $^1$H NMR (400 MHz, $C_6D_6$): δ −1.6 ppm (3H, s, Hf—$CH_3$), −0.65 ppm (3H, s, Hf—$CH_3$), 1.72 ppm (15H, s, Cp-$CH_3$), 2.15 ppm (3H, s, Ind-$CH_3$), 5.12 ppm (1H, d, Ind-CH), 5.22 ppm (1H, d, Ind-CH), 7.06-7.14 ppm (3H, m, Ar—CH), 7.53-7.56 ppm (1H, m, Ar—CH).
SMAO-ES70-875

Methylalumoxane treated silica was prepared according to the following: In a 4 L stirred vessel in a drybox methylalumoxane (MAO, 30 wt % in toluene, approx. 1,000 grams) was added along with approx. 2,000 g of toluene. This solution was then stirred at 60 RPM for 5 minutes. Next, approx. 800 grams of ES-70™ silica (PQ Corporation, Conshohocken, Pa.) that has been calcined at 875° C. (see below) is added to the vessel. This slurry was then heated at 100° C. and stirred at 120 RPM for 3 hours. The temperature was then reduced to 25° C. and cooled to temperature over 2 hours. Once cooled, the vessel was set to 8 RPM and placed under vacuum for 72 hours. After emptying the vessel and sieving the supported MAO, approximately 1,100 g of supported MAO were collected.

Supported Catalyst Complex 1: Complex 3 on SMAO-ES70-875C

A 60.0 g amount of SMAO-ES70-875C was added to a Celestir vessel along with 150 mL toluene. Catalyst 1—dimethylsilyl bis(trimethylsilylmethylene-cyclopentadienide) hafnium dimethyl (1.089 g, 1.919 mmol) and catalyst 3-Bis (1,5,6-trimethylindenyl)hafnium dichloride (0.271 g, 0.481 mmol), were dissolved in 20 mL toluene and added to the Celestir vessel. After stirring for 3 hours, the slurry was then filtered, washed with 20 mL toluene and several 30 mL portions of hexane. The supported catalyst was then dried under vacuum to obtain a white silica.

A 60.0 g amount of SMAO-ES70-875C was added to a Celestir vessel along with 150 mL toluene. Catalyst 2-Tetramethyldisilyl-bis(trimethylsilylmethyl cyclopentadienyl) hafnium dimethyl (0.280 g, 0.592 mmol) and catalyst 4-(1-Methylindenyl)(pentamethylcyclopentadienyl)hafnium dimethyl (0.375 g, 0.599 mmol), were dissolved in 20 mL toluene and added to the Celestir vessel. After stirring for 3 hours, the slurry was then filtered, washed with 20 mL toluene and several 30 mL portions of hexane. The supported catalyst was then dried under vacuum to obtain a white silica.

A 54.0 g amount of SMAO-ES70-875C was added to a Celestir vessel along with 150 mL toluene. Catalyst 2-Tetramethyldisilyl-bis(trimethylsilylmethyl cyclopentadienyl) hafnium dimethyl (0.229 g, 0.484 mmol) and catalyst 4-(1-Methylindenyl)(pentamethylcyclopentadienyl)hafnium dimethyl (0.202, 0.323 mmol) were dissolved in 20 mL toluene and added to the Celestir vessel. After stirring for 3 hours, the slurry was then filtered, washed with 20 mL toluene and several 30 mL portions of hexane. The supported catalyst was then dried under vacuum to obtain a white silica.

Polymerization with Supported Catalyst Systems

Polymerization was performed in a 7 foot tall gas-phase fluidized bed reactor with a 4 foot tall 6" diameter body and a 3 foot tall 10" diameter expanded section. Cycle and feed gases were fed into the reactor body through a perforated distributor plate, and the reactor was controlled at 300 psi and 70 mol % ethylene. Reactor temperature was maintained by heating the cycle gas. Supported catalyst was fed as a 10 wt % slurry in Sono Jell™ from Sonneborn (Parsippany, N.J.). The slurry was delivered to the reactor by nitrogen and isopentane feeds in a ⅛" diameter catalyst probe. Polymer was collected from the reactor as necessary to maintain the desired bed weight. Average process conditions for the polymer collection are shown in Table 2.

Catalysts (1) and (3) co-supported on SMAO-ES70-875C yielded a PE composition in which is largely BCD with some BOCD character with a MIR value of 19. The polymer produced from this mixed catalyst system has a very high percentage of internal unsaturation: >0.4 unsaturations per 1,000 carbons. As illustrated in Table 2, BOCD character increased when using the mixed catalyst system catalyst (2):catalyst (4), thus yielding a polymer with an MIR value of 23. Both systems are highly active. Increasing the % of catalyst 4 (the poor hexene incorporator component) further increased the MIR to a value of 26.5. The data illustrate that the mixed catalyst system of Catalyst 1:Catalyst 3 provides a bimodal polyethylene composition. Hence, under Run 1 and Run 2 conditions in which the catalyst system included Catalyst 1:Catalyst 3 (80:20), MI values were high (0.9 and trending up). Furthermore, the polymer MI, the polymer density and the catalyst productivity increased when the catalyst system Catalyst 1:Catalyst 3 (80:20) is used with a very low concentration of comonomer (0.02% for Run #2 versus 0.64% for Run #1). Indeed, under Run 2 conditions, the MI increased from 0.93 g/cm$^3$ to 0.97 g/cm$^3$, the density increased from 0.9217 g/cm$^3$ to 0.9481 g/cm$^3$ and the catalyst productivity increased from 2,196 g poly/g cat to 2,842 g poly/g cat. Under Run 1 and 2 conditions, negligible changes in MIR were observed as compared to polymer formed under Run 3 and 4 conditions. Furthermore, the productivity of Catalyst 2:Catalyst 4 system under Run 3 conditions was much higher as compared to Run 4 conditions due to the increased amount of Complex 4 (a better hexene incorporator) under Run 3 conditions. Furthermore, polymer produced under each of Run 1, Run 2, Run 3 and Run 4 conditions had a broad orthogonal composition distribution.

Nuclear magnetic resonance measurements of the bimodal polyethylenes revealed some unsaturations, as summarized in Table 3. The labels "Vy1", "Vy2" and "Vy5" refer to proton resonances attributed to the protons on double bonds within the polymer backbone.

Compositionally, the high internal unsaturation selectivity may prove unique for BOCD PE compositions, Table 3. Furthermore, these PE's have high selectivity towards internal unsaturations in the molecular architecture with BOCD as measured by GPC 4D and CFC analysis. Often, a bimodal molecular weight distribution is characterized as having an identifiable high molecular weight component (or distribution) and an identifiable low molecular weight component (or distribution). Both mixed catalyst systems, Catalyst

TABLE 2

Process and product data

| | Run 1 | Run 2 | Run 3 | Run 4 |
|---|---|---|---|---|
| Catalyst # | Complex 1:Complex 3 (80:20) | Complex 1:Complex 3 (80:20) | Complex 4:Complex 2 (50:50) | Complex 4:Complex 2 (60:40), 22 umol/g |
| Start Date | Oct. 4, 2017 | Oct. 8, 2017 | Nov. 12, 2017 | Nov. 18, 2017 |
| Start Time | 1900 | 2300 | 300 | 900 |
| Finish Date | Oct. 6, 2017 | Oct. 10, 2017 | Nov. 14, 2017 | Nov. 20, 2017 |
| Finish Time | 2300 | 1100 | 1300 | 900 |
| Process Data | | | | |
| H$_2$ conc. (molppm) | 360 | 262 | 280 | 295 |
| Hydrogen flow (sccm) | 7.89 | 5.03 | 12.80 | 13.72 |
| C6/C2 Ratio (mol %/mol %) | 0.009 | 0.000 | 0.022 | 0.0249 |
| Comonomer conc. (mol %) | 0.64 | 0.02 | 1.52 | 1.75 |
| C2 conc. (mol %) | 70.1 | 70.0 | 70.0 | 70.2 |
| Comonomer/C2 Flow Ratio | 0.028 | 0.000 | 0.058 | 0.067 |
| C2 flow (g/hr) | 1823 | 1784 | 1824 | 1748 |
| H2/C2 Ratio | 5.1 | 3.8 | 4.0 | 4.2 |
| Rx. Pressure (psig) | 300 | 300 | 300 | 300 |
| Reactor Temp (F.) | 185 | 185 | 185 | 185 |
| Avg. Bedweight (g) | 2497 | 2394 | 2411 | 2409 |
| Production (g/hr) | 448 | 397 | 418 | 344 |
| Residence Time (hr) | 5.6 | 6.0 | 5.8 | 7.0 |
| C2 Utilization (gC2/gC2 poly) | 4.07 | 4.49 | 4.36 | 5.08 |
| Avg Velocity (ft/s) | 2.86 | 2.86 | 2.86 | 2.86 |
| Catalyst Slurry Feed (ml/hr) | 2.3 | 1.6 | 1.7 | 2.11 |
| Catalyst Slurry Conc. (wt frac.) | 0.1 | 0.1 | 0.1 | 0.1 |
| Catalyst Slurry Density (g/ml) | 0.88 | 0.88 | 0.88 | 0.88 |
| Catalyst Feed (g/hr) | 0.204 | 0.140 | 0.154 | 0.186 |
| Cat Activity (g poly/g cat) | 2196 | 2842 | 2707 | 2307 |
| Product Data | | | | |
| Melt Index (MI) | 0.93 | 0.97 | 0.92 | 1.04 |
| HLMI | 17.41 | 18.10 | 20.92 | 27.51 |
| HLMI/MI Ratio | 18.64 | 18.68 | 22.77 | 26.55 |
| Gradient Density | 0.9217 | 0.9481 | 0.9219 | 0.9209 |
| Bulk Density | 0.3409 | 0.2802 | 0.3258 | 0.2085 |

Unsaturation Data $^1$H NMR data was collected at 393K in a 10 mm probe using a Bruker spectrometer with a $^1$H frequency of at least 400 MHz (available from Agilent Technologies, Santa Clara, Calif.). Data was recorded using a maximum pulse width of 45° C., 5 seconds between pulses and signal averaging 512 transients. Spectral signals were integrated and the number of unsaturation types per 1,000 carbons was calculated by multiplying the different groups by 1,000 and dividing the result by the total number of carbons. The number average molecular weight (M$_n$) was calculated by dividing the total number of unsaturated species into 14,000, and has units of g/mol.

1:Catalyst 3 and Catalyst 2:Catalyst 4, are capable of producing a BOCD polymer product. LLDPE and high density PE's were produced with this catalyst system.

Furthermore, the products described herein generate hydrogen and demonstrate a very high level of internal unsaturation, but still maintain good Mw capability. It is noteworthy that the combination of good Mw capability and high level of internal unsaturation lead to the development of a process that does not exhibit termination of the polymerization (e.g., the polymer being formed in the polymerization does not chain terminate at a low Mw).

TABLE 3

Level of unsaturation (internal (I) and terminal (T)) for inventive polyethylenes

| | Run 1 and Run 2 | | Run 3 and Run 4 | |
|---|---|---|---|---|
| | unsaturations per 1000 carbons | | | |
| Vy1 and Vy2 (I) | 0.30 | 0.42 | 0.05 | 0.05 |
| Vy5 (T) | 0.10 | 0.09 | 0.02 | 0.03 |
| Tri-substituted olefins (I) | 0.11 | 0.01 | 0.02 | 0.03 |
| Vinyls (T) | 0.03 | 0.02 | 0.09 | 0.03 |
| Vinylidenes (T) | 0.05 | 0.00 | 0.03 | 0.04 |
| total internal unsaturations | 0.41 | 0.43 | 0.06 | 0.08 |

The FIGURE is a 4D GPC spectrum of a polyethylene resin formed from catalyst system Catalyst 2:Catalyst 4 (40:60; Run 4). As shown in FIG. 1, a polyethylene resin formed from catalyst system Catalyst 2:Catalyst 4 (40:60; Run 4) is bimodal as shown by a low molecular weight peak and high molecular weight peak that are overlapping. Because of the compatibility of a bridged catalyst compound represented by Formula (I) (such as Catalyst 2) with an unbridged metallocene catalyst of Formula (IV) (such as Catalyst 4), the mole ratio of a catalyst compound represented by Formula (I) to metallocene catalyst of Formula (IV) can be readily varied. Varying the mole ratio of the two catalyst compounds provides controlled polyolefin composition formation and access to multimodal polyolefin compositions. For example, the mole ratio of Catalyst 2:Catalyst 4 is 50:50 under Run 3 conditions. An increase in Catalyst 4 content of the catalyst system to, for example, 60:40 under Run 4 conditions, provides more high molecular weight polyolefin content in the resulting polyolefin composition and provides easy control of physical properties of the polyolefin composition.

Measuring $T_{w1}$, $T_{w2}$, $M_{w1}$ and $M_{w2}$ from CFC

Cross-fractionation chromatography (CFC) was used here for determining both molecular weight distribution (MWD) and the short-chain branching distribution (SCBD) compositional information, which utilizes one or more temperature-gradient gel permeation chromatographic columns to compare the inventive polymers to other products on the market. The procedures for interpreting the data obtained from CFC are discussed in more detail below. Among other information, this technique helps to elucidate the level of comonomer on high-to-low molecular weight fractions of polyethylenes.

From the CFC data obtained, each fraction is listed by its fractionation temperature (Ti) along with its normalized weight percent (wt %) value (Wi), cumulative weight percent and various moments of molecular weight averages (including weight average molecular weight, Mwi).

The molecular weight fractions of polyethylenes are then determined by first plotting the elution temperature in centigrade on the x-axis of a graph, while plotting the value of the integral of the weights of polymer that have been eluted up to an elution temperature on the right side y-axis. The closest point at which 50% of the polymer has eluted is determined by the integral, which is used then to divide each of the plots into a $1^{st}$-half and a $2^{nd}$-half.

Qualitatively, a gradient of molecular weight fractions of the polyethylene (a gradient based on both molecular weight of individual polymer chains and the level of branching on each chain) elutes from at least one temperature-gradient gel permeation chromatographic column at a gradient of temperatures, where 50 wt % or less of the cumulative molecular weight polyethylene fractions elutes at a temperature $T_{w1}$, and greater than 50 wt % cumulative molecular weight polyethylene fractions elute at a temperature $T_{w2}$, the molecular weight fractions eluting at $T_{w1}$ being a high molecular weight component $M_{w1}$ and the fractions eluting at $T_{w2}$ being a low molecular weight component $M_{w2}$.

Quantitatively, to calculate values of $T_{w1}$, $T_{w2}$, $M_{w1}$ and $M_{w2}$, the data obtained from fractional CFC was divided into two roughly equal halves. Weight averages of Ti and Mwi for each half were calculated according to the conventional definition of weight average. Fractions which did not have sufficient quantity (<0.5 wt %) to be processed for molecular weight averages in the original data file were excluded from the calculation of $T_{w1}$, $T_{w2}$, $M_{w1}$ and $M_{w2}$.

From the CFC data, the fraction whose cumulative weight percentage (sum weight) is closest to 50% is identified. The fractional CFC data is divided into two halves, for example, Ti≤84° C. as the $1^{st}$ half and Ti>84° C. as the $2^{nd}$ half. Fractions which do not have molecular weight averages reported in the original data file are excluded. The left hand y-axis represents the weight percent (wt %) of the eluted fraction. Using the procedure above to divide the curves into two halves, these values are used to calculate the weight average elution temperature for each half using the formula shown in Equation (1):

$$Tw = \frac{\sum Ti\, Wi}{\sum Wi}. \quad (1)$$

In Equation 1, Ti represents the elution temperature for each eluted fraction and Wi represents the normalized weight % (polymer amount) of each eluted fraction. The left hand axis represents the weight average molecular weight (Mwj) of each eluted fraction. These values are used to calculate the weight average molecular weight for each half using the formula shown in (2):

$$Mw = \frac{\sum Mwi\, Wi}{\sum Wi}. \quad (2)$$

In Equation 2, Mw represents the weight average molecular weight of each eluted fraction and Wi represents the normalized weight % (polymer amount) of each eluted fraction. The values calculated using the techniques described above may be used to classify the MWD×SCBD for experimental polymers and control polymers.

In the plot, the x-axis represents the value of the difference between the first and second weight average elution temperatures ($T_{w1}-T_{w2}$) denoted "Normalized Tw (° C.)". The y-axis in a log scale represents the ratio of the first weight average molecular weight to the second weight average molecular weight ($M_{w1}/M_{w2}$) denoted "Normalized Mw". A generalization among various types of polymer compositions as expressed in the plot can be described as follows:

Point at X=0/Y=0: An ideal case of absolutely narrow MWD and absolutely narrow SCBD. Practically impossible for X=0 due to the forced division along temperature axis into two halves.

Line of X=0: An ideal case of broadening MWD while keeping SCBD absolutely narrow. At X=0, no difference in the direction of moving Y values up or down, that is, broadening MWD while keeping SCBD at absolute narrow.

Line of Y=0: A case of broadening SCBD while keeping MWD unchanged and narrow.

Corner with X<0/Y<1: Products where polymer composition characterized by the combination of Low Mwi/Low Ti (high SCB) molecules with High Mwi/High Ti (low SCB) molecules; exemplified by conventional LLDPE with ZN-catalyst.

Corner with X<0/Y>1: Products where polymer composition characterized by the combination of Low Mwi/High Ti (low SCB) molecules with High Mwi/Low Ti (high SCB) molecules; exemplified by the so-called BOCD (Broad Orthogonal Composition Distribution) or Reversed Composition Distribution products.

Overall, catalyst systems of the present disclosure can provide increased activity or enhanced polymer properties, increased conversion or comonomer incorporation, and can alter comonomer distribution. Catalyst systems and processes of the present disclosure can also provide ethylene polymers having the unique properties of high stiffness, high toughness, good processability and improved film properties. The mixed catalyst systems of the present disclosure provide a good catalytic activity and a unique PE resin with balanced BCD for toughness and stiffness and BOCD character for processability.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

What is claimed is:

1. A catalyst system comprising: activator, support material, a hafnium metallocene catalyst represented by formula (I):

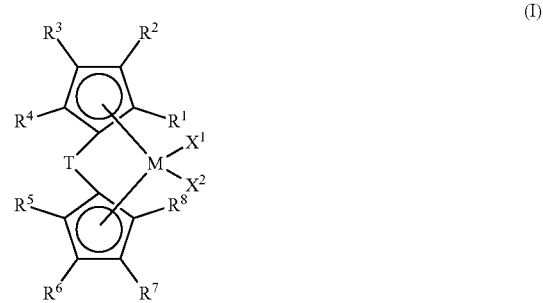

wherein:
M is Hf;
each of $R^1$, $R^2$, $R^3$, $R^4$ $R^5$, $R^6$, $R^7$, and $R^8$ is independently hydrogen, alkoxide, $C_1$ to $C_{40}$ substituted or unsubstituted hydrocarbyl, or —$R^{13}$—$SiR'_3$ or —$R^{13}$—$CR'_3$ wherein $R^{13}$ is $C_1$ to $C_4$ hydrocarbyl, and each R' is independently hydrogen or $C_1$ to $C_{20}$ substituted or unsubstituted hydrocarbyl, or two or more of $R^1$, $R^2$, $R^3$, and $R^4$ form a substituted or unsubstituted, saturated, partially unsaturated or aromatic, cyclic or polycyclic substituent ring, or two or more of $R^5$, $R^6$, $R^7$, and $R^8$ form a substituted or unsubstituted, saturated, partially unsaturated or aromatic, cyclic or polycyclic substituent ring, wherein at least one of $R^1$, $R^2$, $R^3$, $R^4$, $R^5$, $R^6$, $R^7$, and $R^8$ is —$R^{13}$—$SiR'_3$ or —$R^{13}$—$CR'_3$ wherein $R^{13}$ is $C_1$ to $C_4$ hydrocarbyl, and each R' is independently hydrogen or $C_1$ to $C_{20}$ substituted or unsubstituted hydrocarbyl;
T is a bridging group; and
each of $X^1$ and $X^2$ is independently a univalent anionic ligand, or $X^1$ and $X^2$ are joined and together with M to form a metallocyclic ring; and
a hafnium metallocene catalyst that is bis(1,5,6-trimethylindenyl) hafnium dichloride.

2. The catalyst system of claim 1, wherein at least two of $R^1$, $R^2$, $R^3$, $R^4$, $R^5$, $R^6$, $R^7$, and $R^8$ are, independently —$R^{13}$—$SiR'_3$ or —$R^{13}$—$CR'_3$ wherein $R^{13}$ is $C_1$ to $C_4$ hydrocarbyl, and each R' is independently hydrogen or $C_1$ to $C_{20}$ substituted or unsubstituted hydrocarbyl.

3. The catalyst system of claim 1, wherein $R^2$ and $R^7$ are independently —$R^{13}$—$SiR'_3$ or —$R^{13}$—$CR'_3$ wherein $R^{13}$ is a $C_1$ to $C_4$ hydrocarbyl and each R' is independently hydrogen or a $C_1$ to $C_{20}$ substituted or unsubstituted hydrocarbyl.

4. The catalyst system of claim 1, wherein $R^2$ and $R^7$ are independently selected from —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph —CH$_2$—Si(Cy)Ph$_2$, or —CH$_2$—Si(Cy)$_2$Ph.

5. The catalyst system of claim 4, wherein R$^2$ and R$^7$ are each —CH$_2$—SiMe$_3$.

6. The catalyst system of claim 1, wherein T is selected from is selected from R*$_2$C, R*$_2$Si, R*$_2$CSiR*$_2$, R*$_2$SiSiR*$_2$, R*$_2$CSiR*$_2$CR*$_2$, R*$_2$SiCR*$_2$SiR*$_2$, wherein R* is independently hydrogen or a substituted or unsubstituted C$_1$-C$_{20}$ hydrocarbyl, or two or more adjacent R* are joined to form a substituted or unsubstituted, saturated, partially unsaturated or aromatic, cyclic or polycyclic substituent.

7. The catalyst system of claim 2, wherein T is selected from CH$_2$, CH$_2$CH$_2$, SiMe$_2$, SiPh$_2$, Si(Me)$_2$Si(Me)$_2$, SiMePh, or Si(CH$_2$)$_3$.

8. The catalyst system of claim 4, wherein T is R*$_2$SiSiR*$_2$, wherein each R* is unsubstituted C$_1$-C$_{20}$ hydrocarbyl.

9. The catalyst system of claim 1, wherein the catalyst represented by formula (I) is selected from: rac/meso-Me$_4$Si$_2$(3-Me$_3$Si—CH$_2$-Cp)$_2$HfMe$_2$; rac-Me$_4$Si$_2$(3-Me$_3$Si—CH$_2$-Cp)$_2$HfMe$_2$; meso-Me$_4$Si$_2$(3-Me$_3$Si—CH$_2$-Cp)$_2$HfMe$_2$; rac/meso-Me$_2$Si(3-Me$_3$Si—CH$_2$-Cp)$_2$HfMe$_2$; rac-Me$_2$Si(3-Me$_3$Si—CH$_2$-Cp)$_2$HfMe$_2$; Me$_4$Si$_2$(Me$_4$Cp)(3-Me$_3$Si—CH$_2$-Cp)HfMe$_2$; Me$_2$Si(Me$_4$Cp)(3-Me$_3$Si—CH$_2$-Cp)HfMe$_2$; SiMe$_2$(EtMe$_3$Cp)(3-CH$_2$—SiMe$_3$-Cp)HfMe$_2$; SiMe$_2$(Me$_4$Cp)(3-CH$_2$—SiPhMe$_2$-Cp)HfMe$_2$; Si$_2$Me$_4$(Me$_4$Cp)(3-CH$_2$—SiPhMe$_2$-Cp)HfMe$_2$; SiMe$_2$(EtMe$_3$Cp)(3-CH$_2$—SiPh$_3$-Cp)HfMe$_2$; Si$_2$Me$_4$(EtMe$_3$Cp)(3-CH$_2$—SiPh$_3$-Cp)HfMe$_2$; SiMe$_2$(Me$_4$Cp)(3-CH$_2$—SiPh$_3$-Cp)HfMe$_2$; SiMe$_2$(EtMe$_3$Cp)(3-CH$_2$—SiPh$_3$-Cp)HfMe$_2$; SiMe$_2$(2-Me,3-CH$_2$—SiMe$_3$-Ind)$_2$HfMe$_2$; Si$_2$Me$_4$(2-Me,3-CH$_2$—SiMe$_3$-Ind)$_2$HfMe$_2$; SiMe$_2$(2-Me,3-CH$_2$—SiPhMe$_2$-Ind)$_2$HfMe$_2$; Si$_2$Me$_4$(2-Me,3-CH$_2$—SiPhMe$_2$-Ind)$_2$HfMe$_2$; SiMe$_2$(2-Me,3-CH$_2$—SiPh$_3$-Ind)$_2$HfMe$_2$; or Si$_2$Me$_4$(2-Me,3-CH$_2$—SiPh$_3$-Ind)$_2$HfMe$_2$.

10. The catalyst system of claim 1, wherein the activator is an alkylalumoxane.

11. The catalyst system of claim 1, wherein the support material is selected from Al$_2$O$_3$, ZrO$_2$, SiO$_2$, or SiO$_2$/Al$_2$O$_3$.

12. The catalyst system of claim 1, wherein the support material is fluorided silica.

13. A process for polymerization of olefin monomers comprising contacting one or more monomers with a catalyst system of claim 1; and obtaining a polyolefin.

14. The process of claim 13, wherein:
contacting comprises contacting in a single reaction zone, in the gas phase or slurry phase, ethylene and C$_3$ to C$_{20}$ comonomer with the catalyst system; and
obtaining a polyolefin comprises obtaining an ethylene polymer having an weight average molecular weight Mw value of 150,000 g/mol or greater and an internal unsaturation content of 0.2 or greater internal unsaturations per 1,000 carbons.

15. The process of claim 14, wherein the polyolefin has an internal unsaturation content of 0.4 or greater internal unsaturations per 1,000 carbons.

16. The process of claim 14, wherein the polyolefin has a density of from 0.900 g/cm$^3$ to 0.95 g/cm$^3$.

17. A process for polymerization of olefin monomers comprising contacting in a single reaction zone, in the gas phase or slurry phase, ethylene and C$_3$ to C$_{20}$ comonomer with the catalyst system of claim 2; and obtaining an ethylene polymer having an weight average molecular weight Mw value of 150,000 g/mol or greater and an internal unsaturation content of 0.2 or greater internal unsaturations per 1,000 carbons.

18. A process for polymerization of olefin monomers comprising contacting in a single reaction zone, in the gas phase or slurry phase, ethylene and C$_3$ to C$_{20}$ comonomer with the catalyst system of claim 4; and obtaining an ethylene polymer having an weight average molecular weight Mw value of 150,000 g/mol or greater and an internal unsaturation content of 0.2 or greater internal unsaturations per 1,000 carbons.

19. A process for polymerization of olefin monomers comprising contacting in a single reaction zone, in the gas phase or slurry phase, ethylene and C$_3$ to C$_{20}$ comonomer with the catalyst system of claim 8; and obtaining an ethylene polymer having an weight average molecular weight Mw value of 150,000 g/mol or greater and an internal unsaturation content of 0.2 or greater internal unsaturations per 1,000 carbons.

20. A process for polymerization of olefin monomers comprising contacting in a single reaction zone, in the gas phase or slurry phase, ethylene and C$_3$ to C$_{20}$ comonomer with the catalyst system of claim 9; and obtaining an ethylene polymer having an weight average molecular weight Mw value of 150,000 g/mol or greater and an internal unsaturation content of 0.2 or greater internal unsaturations per 1,000 carbons.

* * * * *